US012602073B2

(12) United States Patent
Lee

(10) Patent No.: US 12,602,073 B2
(45) Date of Patent: Apr. 14, 2026

(54) REGISTER CLOCK DRIVER, OPERATING METHOD OF REGISTER CLOCK DRIVER, AND MEMORY MODULE INCLUDING REGISTER CLOCK DRIVER AND PLURALITY OF MEMORY DEVICES

(71) Applicant: SAMSUNG ELECTRONICS CO., LTD., Suwon-si (KR)

(72) Inventor: Bumsoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 309 days.

(21) Appl. No.: 18/105,341

(22) Filed: Feb. 3, 2023

(65) Prior Publication Data

US 2024/0012443 A1     Jan. 11, 2024

(30) Foreign Application Priority Data

Jul. 7, 2022     (KR) ........................ 10-2022-0084016

(51) Int. Cl.
| | |
|---|---|
| *G06F 1/08* | (2006.01) |
| *G06F 1/10* | (2006.01) |
| *G06F 1/12* | (2006.01) |

(52) U.S. Cl.
CPC . *G06F 1/08* (2013.01); *G06F 1/12* (2013.01)

(58) Field of Classification Search
None
See application file for complete search history.

(56) References Cited

U.S. PATENT DOCUMENTS

| | | | |
|---|---|---|---|
| 7,451,337 B1 | 11/2008 | Hewitt | |
| 8,588,341 B2 | 11/2013 | Maeno et al. | |
| 8,665,928 B1 | 3/2014 | Klein et al. | |
| 10,824,575 B2 * | 11/2020 | Lee ...................... | G06F 3/0659 |
| 10,999,050 B1 | 5/2021 | Agarwal | |
| 11,139,904 B2 | 10/2021 | Dejanovic | |
| 11,449,439 B1 * | 9/2022 | Kariya ................ | G06F 13/1689 |
| 11,900,985 B1 * | 2/2024 | Wijetunga ............. | G11C 7/222 |
| 2015/0221355 A1 * | 8/2015 | Vo ......................... | G11C 7/1093 |
| | | | 365/194 |
| 2019/0317548 A1 | 10/2019 | Thong | |
| 2020/0118612 A1 | 4/2020 | Finn et al. | |
| 2020/0126609 A1 | 4/2020 | Kim et al. | |
| 2021/0165587 A1 * | 6/2021 | Choe .................... | G11C 7/1066 |
| 2021/0193203 A1 | 6/2021 | Richards et al. | |
| 2021/0350053 A1 | 11/2021 | Ahuja et al. | |
| 2022/0301608 A1 * | 9/2022 | Sethuraman ......... | G11C 7/1084 |

* cited by examiner

*Primary Examiner* — Fahmida Rahman
(74) *Attorney, Agent, or Firm* — Fish & Richardson P.C.

(57) ABSTRACT

Disclosed is a register clock driver which includes an operating circuit that buffers a command and an address received from an external memory controller, and a training circuit that performs a first training operation and a second training operation in an initialization operation. In the first training operation, one of a plurality of reference clock signals is selected as a first training clock signal for sampling output signals output from the operating circuit. In the second training operation, a second training clock signal for sampling the output signals is selected through phase adjustment based on the first training clock signal.

20 Claims, 18 Drawing Sheets

|  | STEP1 | STEP2 | STEP3 | STEP4 | STEP5 | STEP6 | STEP7 | STEP8 |
|---|---|---|---|---|---|---|---|---|
| RCLK | RCLK1 | RCLK2 | RCLK3 | RCLK4 | RCLK5 | RCLK6 | RCLK7 | RCLK8 |
| FCA1 | 1 | 1 | 1 | 1 | 1 | 1 | 1 | 1 |
| FCA2 | 0 | 0 | 0 | 1 | 1 | 1 | 1 | 1 |
| FCA3 | 0 | 0 | 1 | 1 | 1 | 1 | 1 | 1 |
| FCA4 | 0 | 0 | 0 | 0 | 0 | 0 | 1 | 1 |
| SUM | 0 | 0 | 0 | 0 | 0 | 0 | 1 | 1 |

| | STEP1 | STEP2 | STEP3 | STEP4 | STEP5 | STEP6 | STEP7 | STEP8 |
|---|---|---|---|---|---|---|---|---|
| ICLK | ICLK1 | ICLK2 | ICLK3 | ICLK4 | ICLK5 | ICLK6 | ICLK7 | ICLK8 |
| FCA1 | 1 | 1 | 1 | 1 | 1 | 1 | 1 | 1 |
| FCA2 | 1 | 1 | 1 | 1 | 1 | 1 | 1 | 1 |
| FCA3 | 1 | 1 | 0 | 1 | 1 | 1 | 1 | 1 |
| FCA4 | 0 | 0 | 0 | 1 | 1 | 1 | 1 | 1 |
| SUM | 0 | 0 | 0 | 1 | 1 | 1 | 1 | 1 |

| RCLK | STEP1 | STEP2 | STEP3 | STEP4 | STEP5 | STEP6 | STEP7 | STEP8 |
| | RCLK1 | RCLK2 | RCLK3 | RCLK4 | RCLK5 | RCLK6 | RCLK7 | RCLK8 |
|---|---|---|---|---|---|---|---|---|
| FCA1 | 1 | 1 | 1 | 1 | 1 | 1 | 1 | 0 |
| FCA2 | 0 | 0 | 0 | 1 | 1 | 1 | 1 | 1 |
| FCA3 | 0 | 0 | 1 | 1 | 1 | 1 | 1 | 1 |
| FCA4 | 0 | 0 | 0 | 0 | 0 | 0 | 1 | 1 |
| SUM | 0 | 0 | 0 | 0 | 0 | 0 | 1 | 0 |

REGISTER CLOCK DRIVER, OPERATING METHOD OF REGISTER CLOCK DRIVER, AND MEMORY MODULE INCLUDING REGISTER CLOCK DRIVER AND PLURALITY OF MEMORY DEVICES

CROSS-REFERENCE TO RELATED APPLICATIONS

This application claims priority under 35 U.S.C. § 119 to Korean Patent Application No. 10-2022-0084016 filed on Jul. 7, 2022, in the Korean Intellectual Property Office, the disclosure of which is incorporated by reference in its entirety.

BACKGROUND

Embodiments of the present invention described herein relate to a semiconductor memory, and more particularly, relate to a register clock driver, an operating method of the register clock driver, and a memory module including the register clock driver and a plurality of memory devices.

A semiconductor memory can be classified as a volatile memory, in which stored data disappears when power is turned off, such as a static random access memory (SRAM) or a dynamic random access memory (DRAM), or a non-volatile memory, in which stored data is retained even when power is turned off, such as a flash memory, a phase-change RAM (PRAM), a magnetic RAM (MRAM), a resistive RAM (RRAM), or a ferroelectric RAM (FRAM).

A memory module is a printed circuit board on which one or more memory devices are mounted. The memory module may be used in various computing systems such as a server, a workstation, or a personal computer. As operating speeds of the memory module and the memory devices mounted on the memory module gradually increase, various calibrations or trainings may be performed on a memory device.

SUMMARY OF THE INVENTION

Embodiments of the present disclosure provide a register clock driver with improved operation stability and reliability, an operating method of the register clock driver, and a memory module including the register clock driver and a plurality of memory devices.

According to an example embodiment, a register clock driver includes an operating circuit that buffers a command and an address received from an external memory controller, and a training circuit that performs a first training operation and a second training operation in an initialization operation. In the first training operation, one of a plurality of reference clocks is selected as a first training clock for sampling output signals output from the operating circuit. In the second training operation, a second training clock for sampling the output signals is selected through phase adjustment based on the first training clock.

According to an another example embodiment, an operating method of a register clock driver which includes an operating circuit and a training circuit includes generating, by the training circuit, a pattern in an initialization operation so as to be provided to the operating circuit, performing a first training operation, in which one of a plurality of reference clocks is selected as a first training clock for sampling output signals output from the operating circuit, in the initialization operation, performing a second training operation, in which a second training clock for sampling the output signals is selected through phase interpolation based on the first training clock, in the initialization operation, and sampling output signals output from the operating circuit based on the second training clock in a normal operation such that output command address signals are output to external memory devices.

According to another example embodiment, a memory module includes a plurality of memory devices each including a memory cell array, and a register clock driver connected with the plurality of memory devices. The register clock driver includes an operating circuit that buffers a command and an address received from an external memory controller, and a training circuit that performs a first training operation and a second training operation in an initialization operation. In the first training operation, one of a plurality of reference clocks is selected as a first training clock for sampling output signals output from the operating circuit. In the second training operation, a second training clock for sampling the output signals is selected through phase adjustment based on the first training clock. In a normal operation, the training circuit samples the output signals based on the second training clock and outputs output command address signals to the plurality of memory devices.

BRIEF DESCRIPTION OF THE DRAWINGS

The above and other objects and features of the present disclosure will become apparent by describing in detail example embodiments thereof with reference to the accompanying drawings.

DETAILED DESCRIPTION OF THE INVENTION

Below, example embodiments of the present disclosure will be described in such detail and clearly to an extent that one skilled in the art may easily carry out the present disclosure.

Figure 1:
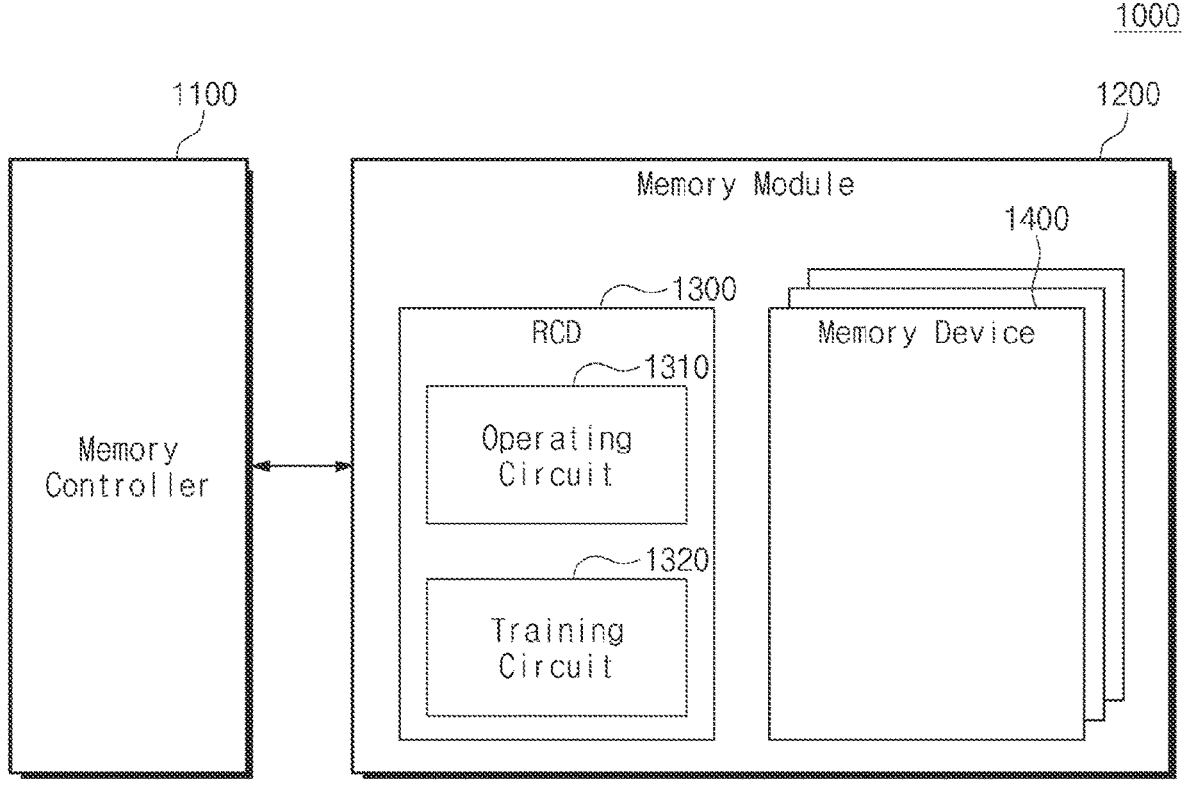
FIG. 1 is a block diagram of an electronic device according to an example embodiment of the present disclosure.

FIG. 1 is a block diagram of an electronic device according to an example embodiment of the present disclosure. An electronic device 1000 may include a memory controller 1100 and a memory module 1200. For example, the electronic device 1000 may be one of various electronic devices such as a desktop computer, a laptop computer, a workstation, a server, or a mobile device.

The memory controller 1100 may control the memory module 1200. The memory controller 1100 may perform data input/output on the memory module 1200. The memory controller 1100 may be implemented in a host (not illustrated), and may access the memory module 1200 depending on a request of a processor (not illustrated) in the host. For example, the memory controller 1100 may access the memory module 1200 in a direct memory access (DMA) manner. The memory controller 1100 may issue a command CMD and an address ADD (or a command/address (CA) signal) defined in the specification of the memory module 1200 to the memory module 1200. In the specification, "CA" may mean a command and an address or a command/address. For example, the CA signal may constitute a command or an address for accessing memory devices 1400.

The memory module 1200 may operate as a buffer memory, a working memory, or a main memory of the host including the memory controller 1100. The memory module 1200 may operate based on the command CMD and the address ADD issued by the memory controller 1100. The memory module 1200 may store data transferred from the memory controller 1100 or may send data to the memory controller 1100. The memory module 1200 may include a register clock driver (RCD) 1300 and the memory devices 1400. The number of register clock drivers 1300 and the number of memory devices 1400 are not limited to the example of FIG. 1, and the memory module 1200 may include at least one or more register clock drivers and at least one or more memory devices.

The register clock driver 1300 may be connected with one or more memory devices 1400. The register clock driver 1300 may drive the one or more memory devices 1400. The register clock driver 1300 may receive a clock signal CK and the CA signals CA from the memory controller 1100 through a CA bus. The register clock driver 1300 may send the received clock signal CK and the received CA signals CA to the memory devices 1400. The register clock driver 1300 may buffer the clock signal CK and the CA signals CA.

In an example embodiment, the register clock driver 1300 may include an operating circuit 1310 and a training circuit 1320. The operating circuit 1310 may be implemented with a buffer for sending the clock signal CK and the CA signals CA of the memory controller 1100 to the memory devices 1400. The memory devices 1400 may receive the clock signal CK and the CA signals CA from the memory controller 1100 through the operating circuit 1310 of the register clock driver 1300. The memory devices 1400 may not receive the clock signal CK and the CA signals CA from the memory controller 1100. The operating circuit 1310 may improve the signal integrity (SI) of the clock signal CK and the CA signals CA that are transferred from the memory controller 1100 to the memory devices 1400.

In an example embodiment, the operating circuit 1310 may not operate in synchronization with a clock. The operating circuit 1310 may receive the synchronized (or aligned) CA signals CA from the memory controller 1100. However, the timing error or the skew mismatch (or misalignment) may occur between the CA signals CA output from the operating circuit 1310 due to various factors. In this case, the CA signals CA may be sampled at the unintended timing. The timing error and the skew mismatch may cause an unintended or unexpected operation. The error may increase as the communication speed becomes higher.

The training circuit 1320 may perform a multi-training operation being a training operation associated with an internal clock. For example, the training circuit 1320 may perform an internal clock training operation for clock domain crossing. The multi-training operation may refer to a training operation that is performed to adjust the sampling timing of the CA signals CA (or output signals) output from the operating circuit 1310.

The multi-training operation may include a first training operation and a second training operation. The first training operation may be a coarse training operation. The first training operation may refer to a training operation that is performed to select a coarse clock for sampling output signals OS of the operating circuit 1310. The first training operation may select one of a plurality of reference clocks as a first training clock TCLK1. The training circuit 1320 may repeatedly perform a detection step in the first training operation. The detection step (or detecting operation) may refer to an operation that is performed to combine an operation of sampling the output signals OS based on a corresponding reference clock for the first training operation and an operation of checking whether a bit error occurs. The training circuit 1320 may search for the first training clock TCLK1 being the most appropriate, through the repetitive detection steps.

The second training operation may be a fine training operation. The second training operation may refer to a training operation that is performed to select a finer clock for sampling the output signals OS of the operating circuit 1310. The training circuit 1320 may generate a plurality of interpolation clocks through phase interpolation based on the first training clock TCLK1. The training circuit 1320 may select one of a plurality of interpolation clocks as a second training clock TCLK2. The training circuit 1320 may repeatedly perform an interpolation step in the second training operation. The interpolation step (or interpolating operation) may refer to an operation that is performed to combine an operation of generating an interpolation clock for the second training operation, an operation of sampling the output signals OS based on a corresponding interpolation clock, and an operation of checking whether a bit error occurs. The training circuit 1320 may search for the second training clock TCLK2 that is the most appropriate, through repetitive interpolation steps. The training circuit 1320 may transfer the synchronized CA signals CA to the memory devices 1400 by sampling signals output from the operating circuit 1310 based on the second training clock TCLK2.

Each of the memory devices 1400 may perform data input/output requested by the memory controller 1100, based on the CA signals CA transferred from the register clock driver 1300. Each of the memory devices 1400 may be referred to as a "memory chip". Each of the memory devices 1400 may include a memory cell array. As described above, the number of memory devices mounted in the memory module 1200 may be one or more. For example, each of a first memory device and a second memory device that are identical to each other may receive the CA signals CA from the register clock driver 1300. That is, the CA signals CA that the first memory device receives may be identical to the CA signals CA that the second memory device receives.

However, a first data input/output path of the first memory device may be different from a second data input/output path of the second memory device. The first memory device may perform data input/output with the memory controller 1100 through the first data input/output path (refer to FIG. 14), based on the CA signals CA. The second memory device may perform data input/output with the memory controller 1100 through the second data input/output path (refer to FIG. 14), based on the CA signals CA.

In an example embodiment, the memory device 1400 may be a dynamic random access memory (DRAM) device, a static random access memory (SRAM) device, a thyristor random access memory (TRAM) device, a NAND flash memory device, a NOR flash memory device, a resistive random access memory (RRAM) device, a ferroelectric random access memory (FRAM) device, a phase change random access memory (PRAM) device, a magnetic random access memory (MRAM) device, etc. A kind of the memory devices 1400 mounted in the memory module 1200 may be one or more. The memory module 1200 may include one of a dual-inline memory module (DIMM), a registered DIMM (RDIMM), a load reduced DIMM (LRDIMM), and a non-volatile DIMM (NVDIMM), which include the memory devices 1400 and the register clock driver 1300. Below, it is assumed that the memory device 1400 is a DRAM device supporting a double data rate (DDR) interface.

The register clock driver 1300 according to the present disclosure may perform the multi-training operation in the initialization process. As such, even though the operating circuit 1310 outputs the misaligned CA signals CA, the training circuit 1320 may adjust the sampling timing to solve the timing error and/or the skew mismatch of the CA signals CA. The stability and reliability of operation of the register clock driver 1300 may be improved. An operation and a configuration of the register clock driver 1300 according to the present disclosure will be described in detail with reference to the following drawings.

Figure 2:
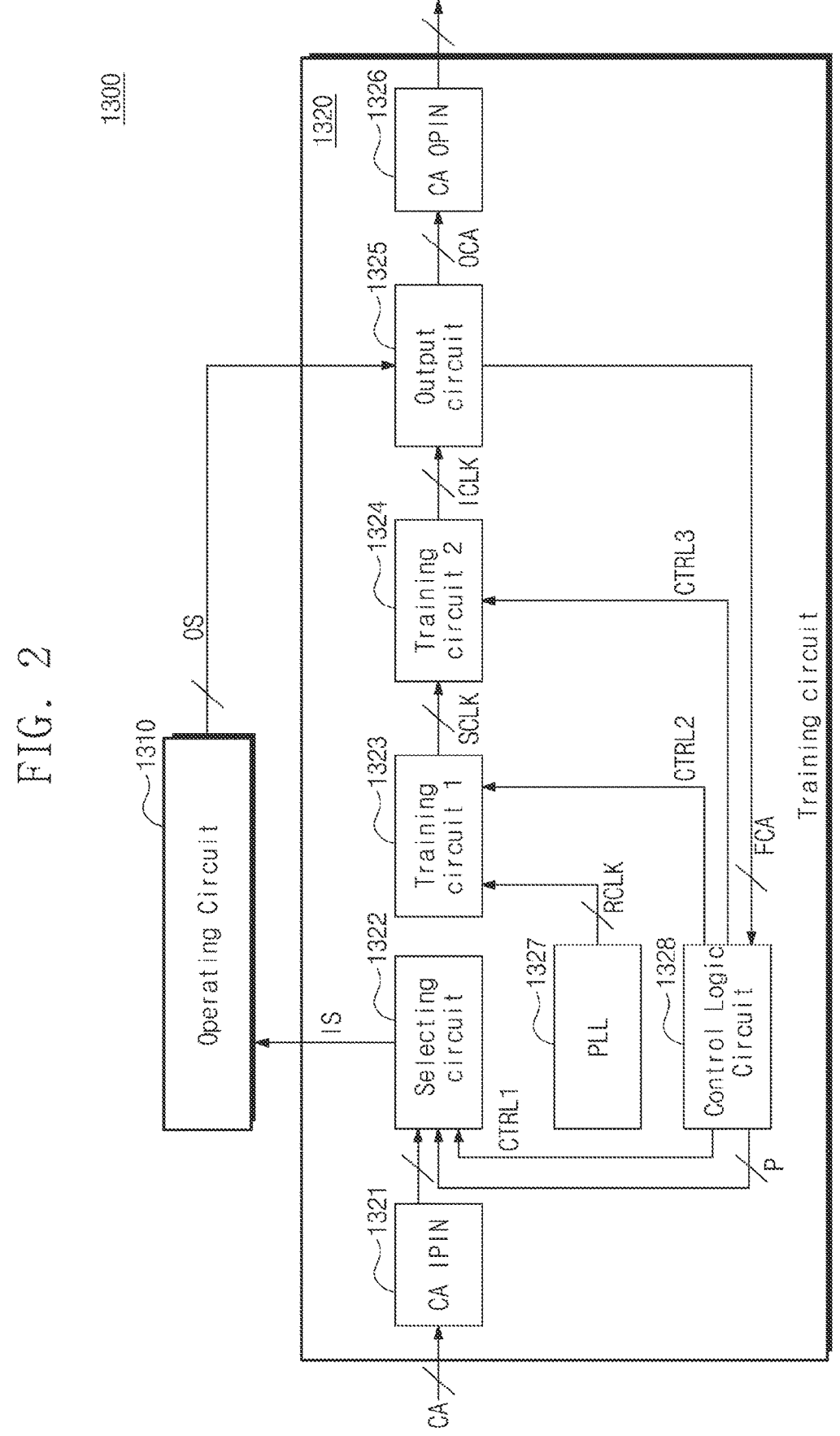
FIG. 2 is a block diagram illustrating the register clock driver of FIG. 1 in detail.

FIG. 2 is a block diagram illustrating the register clock driver of FIG. 1 in detail. Referring to FIGS. 1 and 2, the register clock driver 1300 may include the operating circuit 1310 and the training circuit 1320. The training circuit 1320 may include a CA input pin 1321, a selecting circuit 1322, a first training circuit 1323, a second training circuit 1324, an output circuit 1325, a CA output pin 1326, a phase locked loop (PLL) 1327, and a control logic circuit 1328.

The register clock driver 1300 may receive the CA signals CA from the memory controller 1100 through the CA input pin 1321. The CA input pin 1321 may transfer the received CA signals CA to the selecting circuit 1322.

The selecting circuit 1322 may select either the CA signals CA received through the CA input pin 1321 or a pattern "P" provided from the control logic circuit 1328. The selecting circuit 1322 may receive the CA signals CA through the CA input pin 1321. The selecting circuit 1322 may receive the pattern "P" and a first control signal CTRL1 from the control logic circuit 1328. The selecting circuit 1322 may select either the CA signals CA or the pattern "P" based on the first control signal CTRL1. The selecting circuit 1322 may output either the CA signals CA or the pattern "P" to the operating circuit 1310 as input signals IS. For example, when the first control signal CTRL1 is logic low, the selecting circuit 1322 may output the CA signals CA. When the first control signal CTRL1 is logic high, the selecting circuit 1322 may output the pattern "P".

The operating circuit 1310 may receive the input signals IS from the selecting circuit 1322. The operating circuit 1310 may output the output signals OS to the output circuit 1325. The output signals OS may respectively have different delays due to noise or delay characteristics. That is, the output signals OS may not be aligned.

In an example embodiment, the operating circuit 1310 may be implemented with a digital logic circuit. To meet a fast propagation delay tPDM, the operating circuit 1310 may be implemented with a combination logic that performs a minimum function. Because the operating circuit 1310 does not operate in synchronization with the clock signal, the operating circuit 1310 may receive the synchronized (or aligned or skew-matched) input signals IS but may output unsynchronized (or misaligned or skew-mismatched) output signals OS. Various factors such as a design issue (e.g., a device characteristic or a difference between physical lengths of lines) of the operating circuit 1310 and process, voltage and temperature (PVT) variations may affect the skew between the output signals OS.

The first training circuit 1323 may receive reference clock signals RCLK from the phase locked loop 1327. The first training circuit 1323 may receive a second control signal CTRL2 from the control logic circuit 1328. For example, the first training circuit 1323 may receive first to eighth reference clock signals RCLK1 to RCLK8 having different phases. The first training circuit 1323 may select one of the plurality of reference clock signals RCLK based on the second control signal CTRL2 and may output the selected reference clock to the second training circuit 1324. The first training circuit 1323 may output one of the plurality of reference clock signals RCLK to the second training circuit 1324 as a sampling clock signal SCLK.

The second training circuit 1324 may receive the sampling clock signal SCLK from the first training circuit 1323. The second training circuit 1324 may receive a third control signal CTRL3 from the control logic circuit 1328. The second training circuit 1324 may adjust a phase of the sampling clock signal SCLK based on the third control signal CTRL3. The second training circuit 1324 may generate an interpolation clock signal ICLK through the phase interpolation of the sampling clock signal SCLK based on the third control signal CTRL3. The second training circuit 1324 may output the phase-adjusted interpolation clock signal ICLK to the output circuit 1325.

The output circuit 1325 may receive the output signals OS from the operating circuit 1310. The output circuit 1325 may generate output CA signals OCA and feedback CA signals FCA. The output circuit 1325 may receive the interpolation clock signal ICLK from the second training circuit 1324. The output circuit 1325 may sample the output signals OS based on the interpolation clock signal ICLK. The output circuit 1325 may output the sampled signals as the output CA signals OCA to the memory devices 1400 through the CA output pin 1326. The output circuit 1325 may output the sampled signals as the feedback CA signals FCA to the control logic circuit 1328. The output CA signals OCA may be identical to the feedback CA signals FCA.

The register clock driver 1300 may output the output CA signals OCA to the memory devices 1400 through the CA output pin 1326. The CA output pin 1326 may transfer the received output CA signals OCA to the memory devices 1400.

The phase locked loop 1327 may generate the reference clock signals RCLK. The phase locked loop 1327 may generate the plurality of reference clock signals RCLK having different phases. For example, the phase locked loop 1327 may generate the first to eighth reference clock signals RCLK1 to RCLK8. However, the present disclosure is not limited thereto. For example, the number of reference clock signals generated by the phase locked loop 1327 may decrease or increase depending on the specific implementation of an embodiment. The phase locked loop 1327 may output the first to eighth reference clock signals RCLK1 to RCLK8 to the first training circuit 1323.

The control logic circuit 1328 may generate the pattern "P" and may output the pattern "P" to the selecting circuit 1322. The control logic circuit 1328 may generate the first control signal CTRL1 and may output the first control signal CTRL1 to the selecting circuit 1322. While performing the multi-training operation, the control logic circuit 1328 may set the first control signal CTRL1 to logic high. While performing the normal operation, the control logic circuit 1328 may set the first control signal CTRL1 to logic low.

As such, while performing the multi-training operation, because the first control signal CTRL1 is logic high, the selecting circuit 1322 may output the pattern "P". Because the first control signal CTRL1 is logic low while performing the normal operation, the selecting circuit 1322 may output the CA signals CA received from the memory controller 1100.

The control logic circuit 1328 may generate the second control signal CTRL2 and may output the second control signal CTRL2 to the first training circuit 1323. The second control signal CTRL2 may be used to select one of the reference clock signals RCLK. The control logic circuit 1328 may generate the third control signal CTRL3 and may output the third control signal CTRL3 to the second training circuit 1324. For example, the third control signal CTRL3 may include phase interpolation codes. The third control signal CTRL3 may be referenced in the second training circuit 1324 for phase adjustment.

As described above, the register clock driver 1300 may output the CA signals CA to the memory devices 1400. The register clock driver 1300 may perform the multi-training operation for the purpose of solving the skew mismatch between the CA signals CA that are output to the memory devices 1400. The register clock driver 1300 may perform the first training operation based on clock signals of different phases output from the phase locked loop 1327 and may perform the second training operation by using a phase interpolator.

The register clock driver 1300 may perform the multi-training operation on the clock signal to be used to sample the output signals OS. The register clock driver 1300 may select the second training clock TCLK2 through the multi-training operation. The register clock driver 1300 may sample the output signals OS based on the second training clock signal TCLK2 and may output the output CA signals OCA to the memory devices 1400. As such, the register clock driver 1300 according to the present disclosure may satisfy the fast propagation delay tPDM that is required by the standard.

Figure 3:
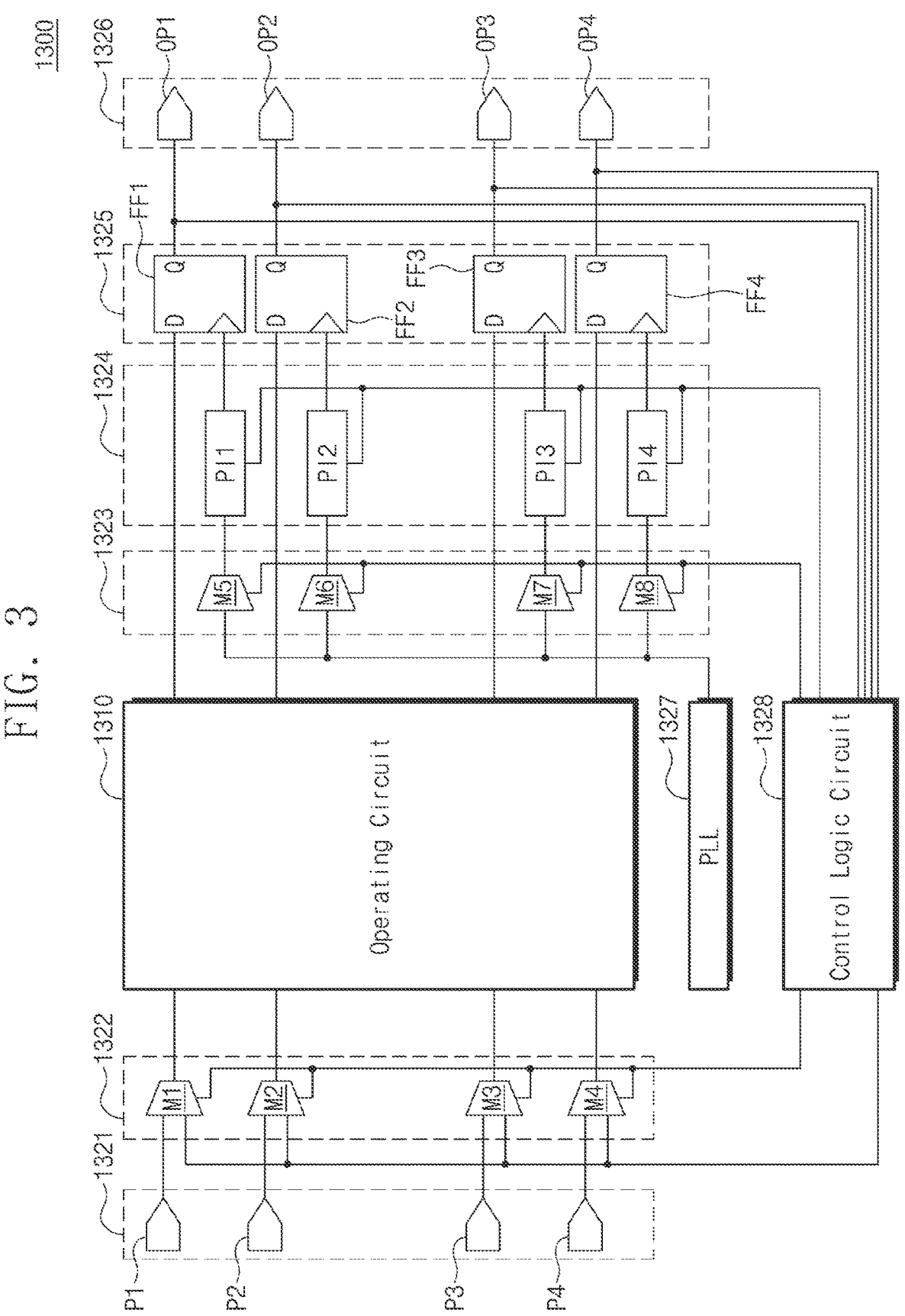
FIG. 3 is a block diagram illustrating the register clock driver of FIG. 1 in detail.

FIG. 3 is a block diagram illustrating the register clock driver of FIG. 1 in detail. In the following drawings, for brevity of drawing and for convenience of description, it is assumed that the CA signals CA include first to fourth CA signals CA1 to CA4. However, the present disclosure is not limited thereto.

Referring to FIGS. 1, 2, and 3, the CA input pin 1321 may include first to fourth input pins IP1 to IP4. The selecting circuit 1322 may include first to fourth multiplexers M1 to M4. The first training circuit 1323 may include fifth to eighth multiplexers M5 to M8. The second training circuit 1324 may include first to fourth phase interpolators PI1 to PI4. The output circuit 1325 may include first to fourth flip-flops FF1 to FF4. The CA output pin 1326 may include first to fourth output pins OP1 to OP4. However, the present disclosure is not limited thereto. For example, the number of input pins included in the CA input pin 1321, the number of multiplexers included in the selecting circuit 1322, the number of multiplexers included in the first training circuit 1323, the number of phase interpolators included in the second training circuit 1324, the number of flip-flops included in the output circuit 1325, and the number of output pins included in the CA output pin 1326 may be decreased or increased depending on the specific implementation of the particular embodiment.

The CA input pin 1321 may transfer the CA signals CA received from the memory controller 1100 to the selecting circuit 1322. The first input pin IP1 may receive the first CA signal CA1 and may transfer the first CA signal CA1 to the first multiplexer M1. The second input pin IP2 may receive the second CA signal CA2 and may transfer the second CA signal CA2 to the second multiplexer M2. The third input pin IP3 may receive the third CA signal CA3 and may transfer the third CA signal CA3 to the third multiplexer M3. The fourth input pin IP4 may receive the fourth CA signal CA4 and may transfer the fourth CA signal CA4 to the fourth multiplexer M4.

The selecting circuit 1322 may output either the CA signals CA or the pattern "P" so as to be output to the operating circuit 1310 as the input signals IS. For example, the pattern "P" may include first to fourth bit data. The pattern "P" may be a bit stream composed of bit "1". However, the present disclosure is not limited thereto.

For example, the first multiplexer M1 may receive the first CA signal CA1 from the first input pin IP1 and the first bit data and the first control signal CTRL1 from the control logic circuit 1328. The first multiplexer M1 may select one of the first CA signal CA1 and the first bit data based on the first control signal CTRL1, so as to be output to the operating circuit 1310 as the first input signal IS1. The second multiplexer M2 may receive the second CA signal CA2 from the second input pin IP2 and the second bit data and the first control signal CTRL1 from the control logic circuit 1328. The second multiplexer M2 may select one of the second CA signal CA2 and the second bit data based on the first control signal CTRL1, so as to be output to the operating circuit 1310 as the second input signal IS2. The remaining multiplexers M3 and M4 are similar to the first and second multiplexers M1 and M2, and thus, additional description will be avoided as unnecessary and redundant.

The operating circuit 1310 may receive the input signals IS (i.e., IS1 to IS4) from the selecting circuit 1322 and may output the output signals OS (i.e., OS1 to OS4) to the output circuit 1325. The first training circuit 1323 may output one of the reference clock signals RCLK as the sampling clock signal SCLK, based on the second control signal CTRL2.

For example, the fifth multiplexer M5 may receive the first to eighth reference clock signals RCLK1 to RCLK8 and the second control signal CTRL2. The fifth multiplexer M5 may select one of the first to eighth reference clock signals RCLK1 to RCLK8 in response to the second control signal CTRL2. The fifth multiplexer M5 may output one signal selected from the first to eighth reference clock signals RCLK1 to RCLK8 as a sampling clock signal SCLK[1]. The fifth multiplexer M5 may output the sampling clock signal SCLK[1] to the first phase interpolator PI1. The sixth multiplexer M6 may receive the first to eighth reference clock signals RCLK1 to RCLK8 and the second control signal CTRL2. The sixth multiplexer M6 may select one of the first to eighth reference clock signals RCLK1 to RCLK8 in response to the second control signal CTRL2. The sixth multiplexer M6 may output one selected from the first to eighth reference clock signals RCLK1 to RCLK8 as a sampling clock signal SCLK[2]. The sixth multiplexer M6 may output the sampling clock signal SCLK[2] to the second phase interpolator P12. The remaining multiplexers M7 and M8 are similar to the fifth and sixth multiplexers M5 and M6, and thus, additional description will be omitted to avoid redundancy.

The second training circuit 1324 may generate the interpolation clock signal ICLK through the phase interpolation based on the sampling clock signal SCLK and the third control signal CTRL3. For example, the first phase interpolator PI1 may receive the sampling clock signal SCLK[1] from the fifth multiplexer M5 and may receive the third control signal CTRL3 from the control logic circuit 1328. The first phase interpolator PI1 may generate the interpolation clock signal ICLK[1] by adjusting the phases of the sampling clock signal SCLK[1] based on the third control signal CTRL3. The first phase interpolator PI1 may output the interpolation clock signal ICLK[1] to the first flip-flop FF1. The second phase interpolator PI2 may receive the sampling clock signal SCLK[2] from the sixth multiplexer M6 and may receive the third control signal CTRL3 from the control logic circuit 1328. The second phase interpolator PI2 may generate the interpolation clock signal ICLK[2] by adjusting the phases of the sampling clock signal SCLK[2] based on the third control signal CTRL3. The second phase interpolator PI2 may output the interpolation clock signal ICLK[2] to the second flip-flop FF2. The remaining phase interpolators PI3 and PI4 are similar to the first and second phase interpolators PI1 and PI2, and thus, additional description will be omitted to avoid redundancy.

The output circuit 1325 may receive the output signals OS and the interpolation clock signal ICLK and may output the output CA signals OCA and the feedback CA signals FCA. For example, the first flip-flop FF1 may include a clock input terminal, an input terminal "D", and an output terminal "Q". The first flip-flop FF1 may receive the interpolation clock signal ICLK[1] from the first phase interpolator PI1 through the clock input terminal, may receive the first output signal OS1 through the input terminal "D", and may output the first output CA signal OCA1 through the output terminal "Q". The first flip-flop FF1 may operate in response to the interpolation clock signal ICLK[1]. In response to the rising edge of the interpolation clock signal ICLK[1], the first flip-flop FF1 may output a logical level (e.g., logic high or logic low) of the first output signal OS1 as the first output CA signal OCA1 and the first feedback CA signal FCA1 through the output terminal "Q". The first flip-flop FF1 may transfer the first output CA signal OCA1 to the first output pin OP1 and may send the first feedback CA signal FCA1 to the control logic circuit 1328.

The second flip-flop FF2 may include a clock input terminal, an input terminal "D", and an output terminal "Q". The second flip-flop FF2 may receive the interpolation clock signal ICLK[2] from the second phase interpolator PI2 through the clock input terminal, may receive the second output signal OS2 through the input terminal "D", and may output the second output CA signal OCA2 through the output terminal "Q". The second flip-flop FF2 may operate in response to the interpolation clock signal ICLK[2]. In response to the rising edge of the interpolation clock signal ICLK[2], the second flip-flop FF2 may output the logical level of the second output signal OS2 as the second output CA signal OCA2 and the second feedback CA signal FCA2 through the output terminal "Q". The second flip-flop FF2 may transfer the second output CA signal OCA2 to the second output pin OP2 and may send the second feedback CA signal FCA2 to the control logic circuit 1328. The remaining flip-flops FF3 and FF4 are similar to the first and second flip-flops FF1 and FF2, and thus, additional description will be omitted to avoid redundancy.

The CA output pin 1326 may transfer the output CA signals OCA received from the output circuit 1325 to the memory devices 1400. The first output pin OP1 may receive the first output CA signal OCA1 from the first flip-flop FF1 and may transfer the first output CA signal OCA1 to the memory devices 1400. The second output pin OP2 may receive the second output CA signal OCA2 from the second flip-flop FF2 and may transfer the second output CA signal OCA2 to the memory devices 1400. The third output pin OP3 may receive the third output CA signal OCA3 from the third flip-flop FF3 and may transfer the third output CA signal OCA3 to the memory devices 1400. The fourth output pin OP4 may receive the fourth output CA signal OCA4 from the fourth flip-flop FF4 and may transfer the fourth output CA signal OCA4 to the memory devices 1400.

As described above, the register clock driver 1300 may receive the synchronized CA signals CA from the memory controller 1100. However, various factors described above may affect the skew between the output signals OS output from the operating circuit 1310 and/or the delay of each of the output signals OS. The register clock driver 1300 may solve the skew mismatch associated with the output signals OS through the multi-training operation.

Figure 4:
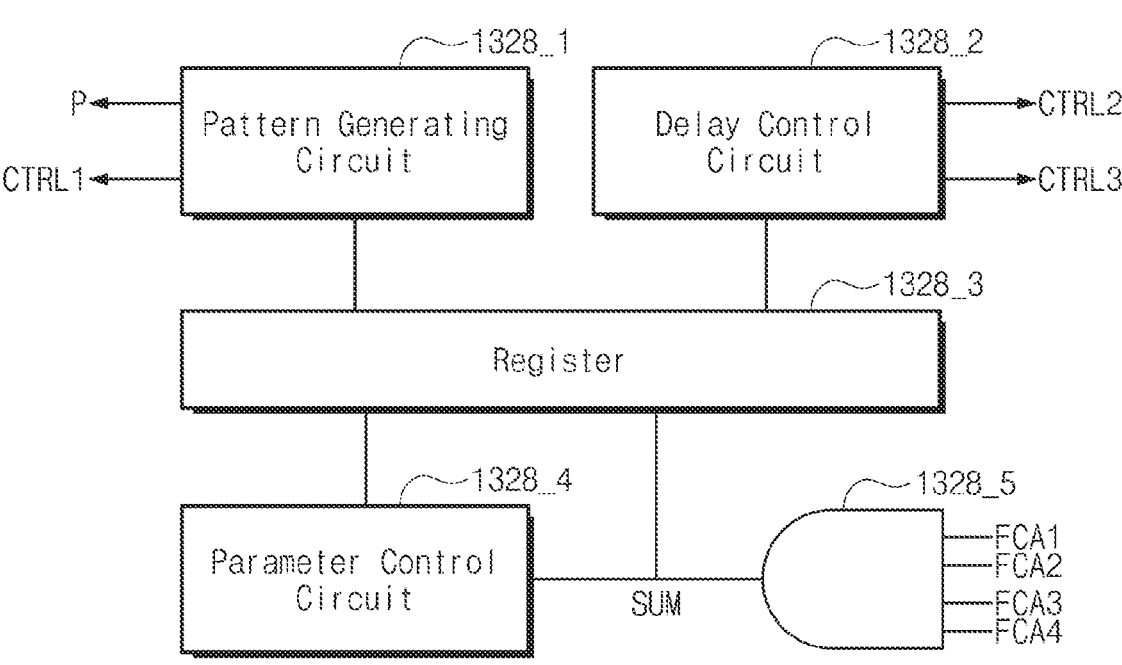
FIG. 4 is a block diagram illustrating the control logic circuit of FIG. 2 in detail.

FIG. 4 is a block diagram illustrating a control logic circuit of FIG. 2 in detail. Referring to FIGS. 2, 3, and 4, the control logic circuit 1328 may include a pattern generating circuit 13281, a delay control circuit 1328_2, a register 13283, a parameter control circuit 1328_4, and an AND gate 1328_5.

The pattern generating circuit 13281 may generate data to be used in the training operation. The pattern generating circuit 1328_1 may generate the pattern "P" including the first to fourth bit data. The pattern generating circuit 13281 may provide the pattern "P" to the selecting circuit 1322. For example, the pattern generating circuit 1328_1 may generate the bit stream (e.g., "1111") composed of bit "1" as the pattern "P".

The delay control circuit 13282 may generate the first to third control signals CTRL1 to CTRL3. The delay control circuit 1328_2 may generate the first control signal CTRL1. The delay control circuit 13282 may provide the first control signal CTRL1 to the selecting circuit 1322. In normal operation, the delay control circuit 1328_2 may set the first control signal CTRL1 to logic low such that the selecting circuit 1322 selects the CA signals CA. In the multi-training operation, the delay control circuit 13282 may set the first control signal CTRL1 to logic high such that the selecting circuit 1322 selects the pattern "P".

The delay control circuit 13282 may provide the second control signal CTRL2 to the first training circuit 1323 and may provide the third control signal CTRL3 to the second training circuit 1324. The delay control circuit 1328_2 may set (or control) the second control signal CTRL2 so as to sequentially select the plurality of reference clock signals RCLK one by one. For example, while the first training operation is performed, the delay control circuit 1328_2 may set the second control signal CTRL2 such that the first reference clock signal RCLK1 is selected in a first detection step STEP1 and may set the second control signal CTRL2 such that the second reference clock signal RCLK2 is selected in a second detection step STEP2. The remaining detection steps STEP3 to STEP8 are similar to the above description, and thus, additional description will be omitted to avoid redundancy.

The delay control circuit 1328_2 may set (or control) the third control signal CTRL3 so to sequentially generate a plurality of interpolation clock signals ICLK. For example, while the second training operation is performed, the delay control circuit 1328_2 may set the third control signal CTRL3 such that the first interpolation clock signal ICLK1 is generated in a first interpolation step ISTEP1 and may set the third control signal CTRL3 such that the second interpolation clock signal ICLK2 is generated in a second interpolation step ISTEP2. The remaining interpolation steps ISTEP3 to ISTEP8 are similar to the above description, and thus, additional description will be omitted to avoid unnecessary redundancy.

The register 1328_3 may receive a sum signal SUM output from the AND gate 1328_5 and may store the sum signal SUM. The register 1328_3 may be implemented with a shift register. In an example embodiment, the register 1328_3 may store information indicating a reference clock signal corresponding to a detection step where the sum signal SUM is "1" and information indicating an interpolation clock signal corresponding to an interpolation step where the sum signal SUM is "1". The register 13283 may store a parameter(s) of the multi-training operation.

The parameter control circuit 13284 may control the parameter that is used in the first training operation or the second training operation. For example, the parameter control circuit 1328_4 may set an interpolation count of the second training operation and an interpolation section of the second training operation. This will be described in detail with reference to FIGS. 10 to 12B.

The AND gate 13285 may receive the feedback CA signals FCA (i.e., FCA1 to FCA4). The AND gate 1328_5 may perform a logical operation (e.g., an AND operation) on the first to fourth feedback CA signals FCA1 to FCA4. The AND gate 13285 may output a result of performing the logical operation on the feedback CA signals FCA as the sum signal SUM.

Figure 5:
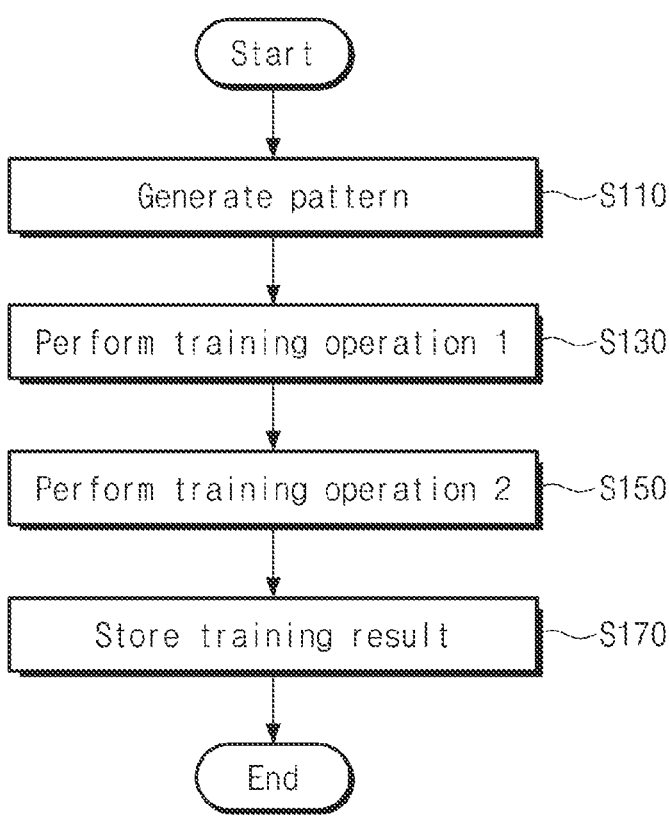
FIG. 5 is a flowchart illustrating an example of the operation of a register clock driver of FIG. 1.

FIG. 5 is a flowchart illustrating an example of an operation of a register clock driver of FIG. 1. The multi-training operation of the register clock driver 1300 will be described with reference to FIG. 5. When the electronic device 1000 is powered up, the memory controller 1100 and the memory module 1200 may perform the initialization operation depending on a given manner. During the initialization operation, the memory controller 1100 may provide a power supply voltage to the memory module 1200, may perform various initial setting operations, and may read necessary information from the memory module 1200 or may set necessary information.

In an example embodiment, in the initialization operation, the register clock driver 1300 may perform a command address training operation with the memory controller 1100. For example, the memory controller 1100 and the register clock driver 1300 may perform the command address training operation for the purpose of improving a timing margin of the command CMD and the address ADDR. An internal CA reference voltage may be calibrated through the command address training operation, and the CA signals CA may be aligned to the clock signal CK for a high-speed operation.

In an example embodiment, in the initialization operation, the register clock driver 1300 may perform a ZQ calibration operation with the memory controller 1100. The memory controller 1100 may send a ZQ calibration command for the ZQ calibration operation to the register clock driver 1300. The memory controller 1100 may control ZQ calibration of the register clock driver 1300 through the ZQ calibration command.

The register clock driver 1300 may perform the multi-training operation simultaneously while performing the initialization operation with the memory controller 1100 (e.g., the initialization operation for an interface between the memory controller 1100 and the register clock driver 1300). The multi-training operation may be performed to solve the skew mismatch of the output CA signals OCA to be output from the register clock driver 1300 to the memory devices 1400, and may not affect the initialization operation for the interface between the memory controller 1100 and the register clock driver 1300 (e.g., command address training and ZQ calibration). As such, the register clock driver 1300 may perform the multi-training operation while performing the initialization operation with the memory controller 1100. The register clock driver 1300 may complete the multi-training operation before the normal operation. That is, the multi-training operation may not require additional time.

Referring to FIGS. 1, 2, and 5, in operation S110, the register clock driver 1300 may generate the pattern "P". For example, the control logic circuit 1328 may generate the pattern "P" having a bit stream composed of bit "1". The control logic circuit 1328 may set the first control signal CTRL1 to logic high. As such, the selecting circuit 1322 may select the pattern "P" among the CA signals CA and the pattern "P" in response to the first control signal CTRL1 and may provide the pattern "P" as the input signals IS to the operating circuit 1310.

In operation S130, the register clock driver 1300 may perform the first training operation. The first training operation may be a coarse training operation. The first training operation may refer to a training operation that is performed to select a coarse clock signal for sampling the output signals OS of the operating circuit 1310. The register clock driver 1300 may select one of the reference clock signals RCLK generated by the phase locked loop 1327 as the first training clock signal TCLK1.

In operation S150, the register clock driver 1300 may perform the second training operation. The second training operation may be a fine training operation. The second training operation may refer to a training operation that is performed to select a finer clock signal for sampling the output signals OS of the operating circuit 1310. The register clock driver 1300 may generate the interpolation clock signal ICLK through phase interpolation based on the first training clock signal TCLK1. The register clock driver 1300 may select one of the interpolation clock signal ICLK as the second training clock signal TCLK2.

In operation S170, the register clock driver 1300 may store a training result in the register 1328_3 or a memory. For example, the register clock driver 1300 may store the training result such that the output signals OS of the operating circuit 1310 are sampled based on the second training clock signal TCLK2 in a normal operation after the completion of the initialization operation.

For example, the training result may include information about the first training clock signal TCLK1 and information about the second training clock signal TCLK2. The training result may include information indicating a reference clock selected from the plurality of reference clock signals RCLK. The training result may include information indicating an interpolation clock selected from the plurality of interpolation clock signals ICLK.

As described above, the multi-training operation according to an example embodiment of the present disclosure may be performed independently of the initialization operation that is performed between the register clock driver 1300 and the memory controller 1100. The multi-training operation may include the first training operation and the second training operation. In the first training operation, the register clock driver 1300 may select one of the plurality of reference clock signals RCLK generated by the phase locked loop 1327 as the first training clock signal TCLK1. In the second training operation, the register clock driver 1300 may generate the interpolation clock signals ICLK through phase interpolation based on the first training clock signal TCLK1. The register clock driver 1300 may select one of the plurality of interpolation clock signals ICLK as the second training clock signal TCLK2.

Figure 6:
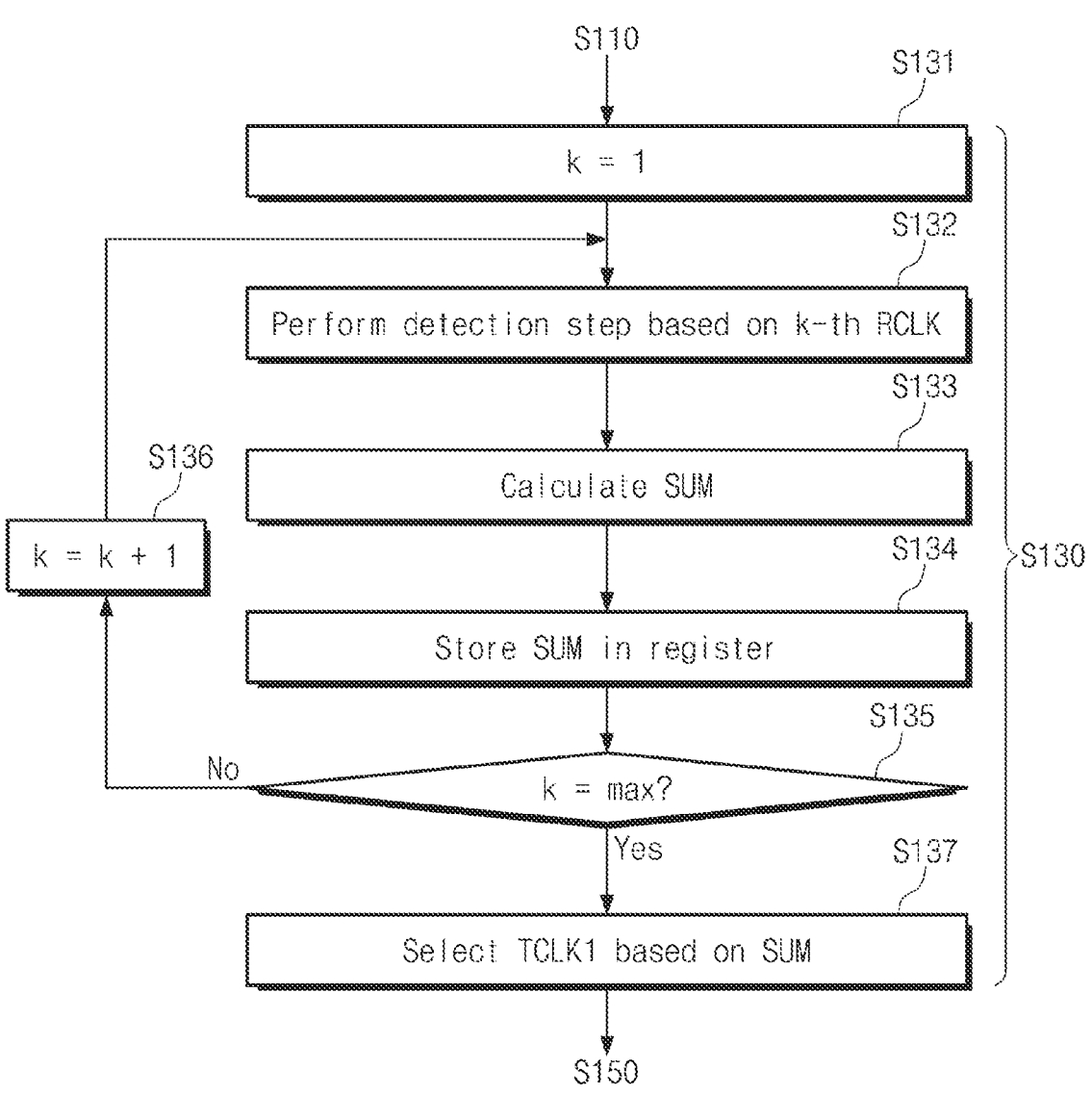
FIG. 6 is a flowchart illustrating the operation S130 of FIG. 5 in detail.

FIG. 6 is a flowchart illustrating operation S130 of FIG. 5 in more detail. The first training operation of the register clock driver 1300 will be described with reference to FIG. 6. Referring to FIGS. 2, 5, and 6, operation S130 may include operation S131 to operation S137. In operation S131, a variable "k" may be set to "1". In an example embodiment, the variable "k" is used to describe a detection step that is repeatedly performed, however the present disclosure is not limited thereto.

In operation S132, the register clock driver 1300 may perform a k-th detection step STEPk based on a k-th reference clock signal RCLKk. For example, the control logic circuit 1328 may set the second control signal CTRL2 such that the k-th reference clock signal RCLKk is selected. The selecting circuit 1322 may output the k-th reference clock signal RCLKk as the sampling clock signal SCLK. The output circuit 1325 may sample the output signals OS based on the k-th reference clock signal RCLKk. The control logic circuit 1328 may receive the sampled feedback CA signals FCA. In operation S133, the register clock driver 1300 may calculate the sum signal SUM. For example, the control logic circuit 1328 may generate the sum signal SUM by performing a logical operation (e.g., an AND operation) on the received feedback CA signals FCA. The detection step will be described in detail with reference to FIGS. 7A and 7B.

In operation S134, the register clock driver 1300 may store the sum signal SUM in the register 1328_3. For example, the control logic circuit 1328 may store the sum signal SUM in the shift register. Alternatively, the control logic circuit 1328 may store the sum signal SUM and the variable "k" in the register 1328_3.

In operation S135, whether the variable "k" is a maximum value (e.g., the number of reference clock signals RCLK) is determined. When the variable "k" is not the maximum value, in operation S136, the variable "k" increases as much as "1". Afterwards, the register clock driver 1300 may perform operation S132. The register clock driver 1300 may repeatedly perform the detection step based on a selected reference clock signal.

When the detection step is performed on all the reference clock signals RCLK (i.e., Yes in operation S135), the register clock driver 1300 may perform operation S137. In operation S137, the register clock driver 1300 may select the first training clock signal TCLK1 based on the sum signal SUM. For example, the control logic circuit 1328 may select one, which corresponds to a detection step where the sum signal SUM is "1", from among reference clock signals as the first training clock signal TCLK1.

Figure 7A:
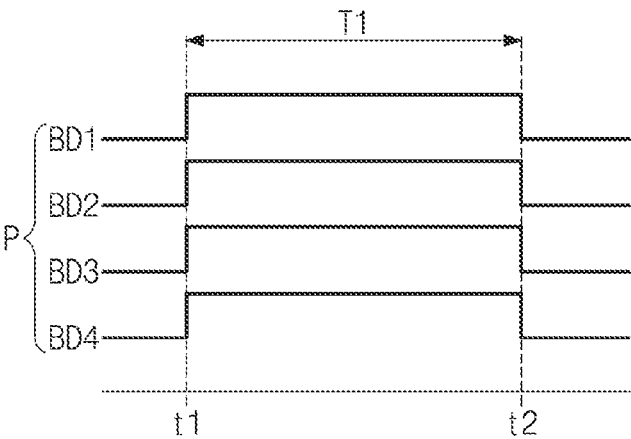
FIGS. 7A and 7B are diagrams for describing the operation of a first training operation.
Figure 7B:
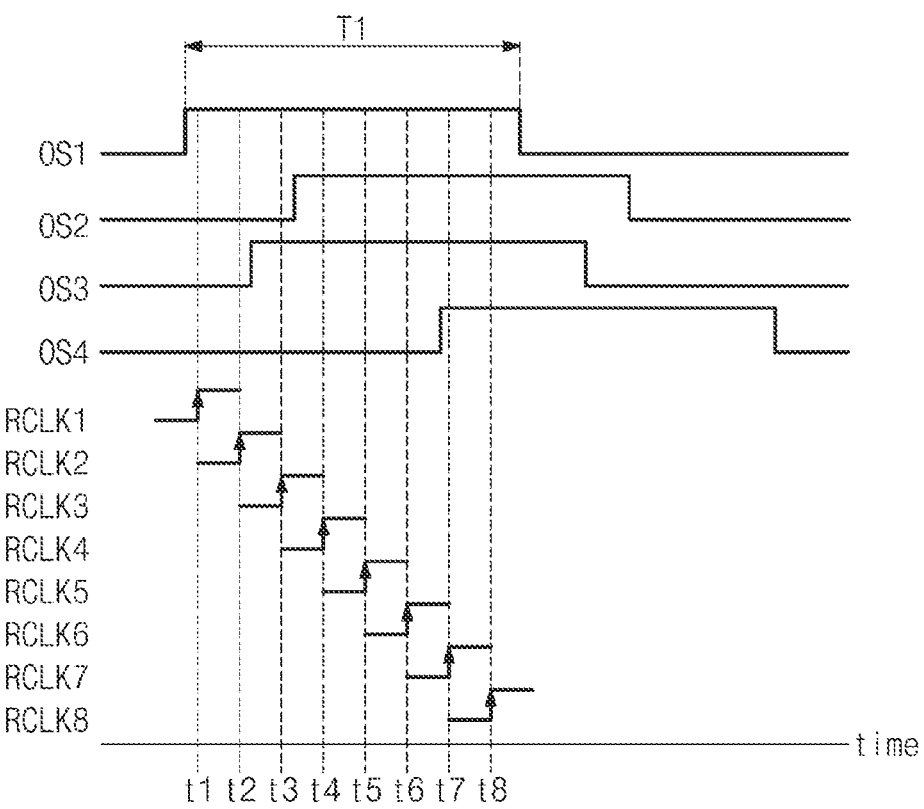

FIGS. 7A and 7B are diagrams for describing an operation of a first training operation. Referring to FIGS. 3 and 7A, the control logic circuit 1328 may generate the pattern "P". The control logic circuit 1328 may generate a pulse being logic high during a first time period T1. For example, the control logic circuit 1328 may generate first to fourth bit data BD1 to BD4. The first to fourth bit data BD1 to BD4 may be logic high during the first time period T1.

The control logic circuit 1328 may generate the first to fourth bit data BD1 to BD4 being synchronized (or aligned). For example, each of the first to fourth bit data BD1 to BD4 may transition from logic low to logic high at a first time t1. Each of the first to fourth bit data BD1 to BD4 may transition from logic high to logic low at a second time t2.

In the multi-training operation, the selecting circuit 1322 may send the pattern "P" (e.g., the first to fourth bit data BD1 to BD4) to the operating circuit 1310 in response to the first control signal CTRL1. The operating circuit 1310 may receive the input signals IS (e.g., the first to fourth bit data BD1 to BD4) provided from the selecting circuit 1322 and may output the output signals OS. Delays of the output signals OS may be different due to various factors described above. That is, the output signals OS may not be mutually aligned.

Referring to FIG. 7B, the first output signal OS1 may transition from logic low to logic high before a first time t1, the second output signal OS2 may transition from logic low to logic high between a third time t3 and a fourth time t4, the third output signal OS3 may transition from logic low to logic high between a second time t2 and the third time t3, the fourth output signal OS4 may transition from logic low to logic high between a sixth time t6 and a seventh time t7.

In an example embodiment, the phase locked loop 1327 may generate the plurality of reference clock signals RCLK and may provide the plurality of reference clock signals RCLK to the first training circuit 1323. For example, the phase locked loop 1327 may generate the first to eighth reference clock signals RCLK1 to RCLK8 having different phases. The first reference clock signal RCLK1 may have a rising edge at the first time t1; the second reference clock signal RCLK2 may have a rising edge at the second time t2; the third reference clock signal RCLK3 may have a rising edge at the third time t3; the fourth reference clock signal RCLK4 may have a rising edge at the fourth time t4; the fifth reference clock signal RCLK5 may have a rising edge at a fifth time t5; the sixth reference clock signal RCLK6 may have a rising edge at the sixth time t6; the seventh reference clock signal RCLK7 may have a rising edge at the seventh time t7; and, the eighth reference clock signal RCLK8 may have a rising edge at an eighth time t8.

The register clock driver 1300 may repeatedly perform the detection step in the first training operation. Below, it is assumed that the variable "k" is "8". However, the present disclosure is not limited thereto. For example, the number of detection steps to be performed may increase or decrease depending on the particular implementation. The register clock driver 1300 may perform first to eighth detection steps STEP1 to STEP8. In the first detection step STEP1, the register clock driver 1300 may perform the detection step based on the first reference clock signal RCLK1. The control logic circuit 1328 may set the second control signal CTRL2 such that the first reference clock signal RCLK1 is selected and may send the second control signal CTRL2 to the first training circuit 1323. The first training circuit 1323 may select the first reference clock signal RCLK1 among the plurality of reference clocks signals RCLK1 to RCLK8 in response to the second control signal CTRL2 and may send the first reference clock signal RCLK1 as the sampling clock signal SCLK to the second training circuit 1324.

In an example embodiment, while the first training operation is performed, the control logic circuit 1328 may control the third control signal CTRL3 such that the phase interpolation is not performed in the second training circuit 1324.

The second training circuit 1324 may output the received sampling clock signal SCLK as the interpolation clock signal ICLK without modification. That is, the second training circuit 1324 may not perform the phase interpolating operation and may output the received sampling clock signal SCLK as the interpolation clock signal ICLK.

The output circuit 1325 may receive the interpolation clock signal ICLK and the output signals OS and may output the feedback CA signals FCA to the control logic circuit 1328. Because the first reference clock signal RCLK1 has the rising edge at the first time t1, the first flip-flop FF1 may output a first feedback CA signal FCA1 having logic high (e.g., "1"), the second flip-flop FF2 may output a second feedback CA signal FCA2 having logic low (e.g., "0"), the third flip-flop FF3 may output a third feedback CA signal FCA3 having logic low (e.g., "0"), and the fourth flip-flop FF4 may output a fourth feedback CA signal FCA4 having logic low (e.g., "0").

The control logic circuit 1328 may receive the feedback CA signals FCA1 to FCA4, and the control logic circuit 1328 may generate the sum signal SUM by performing a logical operation on the feedback CA signals FCA1 to FCA4. Because the first feedback CA signal FCA1 is logic high (e.g., "1") and the second to fourth feedback CA signals FCA2 to FCA4 are logic low (e.g., "0"), the sum signal SUM of the first detection step STEP1 may be logic low (e.g., "0"). The control logic circuit 1328 may store the sum signal SUM of the first detection step STEP1 in the register 1328_3.

In the second detection step STEP2, the register clock driver 1300 may perform the detection step based on the second reference clock signal RCLK2. The control logic circuit 1328 may set the second control signal CTRL2 such that the second reference clock signal RCLK2 is selected and may send the second control signal CTRL2 to the first training circuit 1323. The first training circuit 1323 may select the second reference clock signal RCLK2 among the plurality of reference clock signals RCLK1 to RCLK8 in response to the second control signal CTRL2 and may send the second reference clock signal RCLK2 as the sampling clock signal SCLK to the second training circuit 1324.

The second training circuit 1324 may output the received sampling clock signal SCLK as the interpolation clock signal ICLK without modification. That is, the second training circuit 1324 may not perform the phase interpolating operation and may output the received sampling clock signal SCLK as the interpolation clock signal ICLK.

The output circuit 1325 may receive the interpolation clock signal ICLK and the output signals OS and may output the feedback CA signals FCA to the control logic circuit 1328. Because the second reference clock signal RCLK2 has the rising edge at the second time t2, the first flip-flop FF1 may output the first feedback CA signal FCA1 having logic high (e.g., "1"), the second flip-flop FF2 may output the second feedback CA signal FCA2 having logic low (e.g., "0"), the third flip-flop FF3 may output the third feedback CA signal FCA3 having logic low (e.g., "0"), and the fourth flip-flop FF4 may output the fourth feedback CA signal FCA4 having logic low (e.g., "0").

The control logic circuit 1328 may receive the feedback CA signals FCA1 to FCA4, and the control logic circuit 1328 may generate the sum signal SUM by performing a logical operation on the feedback CA signals FCA1 to FCA4. Because the first feedback CA signal FCA1 is logic high (e.g., "1") and the second to fourth feedback CA signals FCA2 to FCA4 are logic low (e.g., "0"), the sum signal SUM of the second detection step STEP2 may be logic low (e.g., "0"). The control logic circuit 1328 may store the sum signal SUM of the second detection step STEP2 in the register 1328_3. The remaining detection steps STEP3 to STEP8 are similar to those described above, and thus, additional description will be omitted to avoid unnecessary redundancy.

In the third detection step STEP3, the control logic circuit 1328 may set the second control signal CTRL2 such that the third reference clock signal RCLK3 is selected and may send the second control signal CTRL2 to the first training circuit 1323. The first training circuit 1323 may output the third reference clock signal RCLK3 as the sampling clock signal SCLK. Because the third reference clock signal RCLK3 has the rising edge at the third time t3, the first flip-flop FF1 may output the first feedback CA signal FCA1 having logic high (e.g., "1"), the second flip-flop FF2 may output the second feedback CA signal FCA2 having logic low (e.g., "0"), the third flip-flop FF3 may output the third feedback CA signal FCA3 having logic high (e.g., "1"), and the fourth flip-flop FF4 may output the fourth feedback CA signal FCA4 having logic low (e.g., "0"). Because the first and third feedback CA signals FCA1 and FCA3 are logic high (e.g., "1") and the second and fourth feedback CA signals FCA2 and FCA4 are logic low (e.g., "0"), the control logic circuit 1328 may generate the sum signal SUM of logic low (e.g., "0").

In the fourth detection step STEP4, the control logic circuit 1328 may set the second control signal CTRL2 such that the fourth reference clock signal RCLK4 is selected and may send the second control signal CTRL2 to the first training circuit 1323. The first training circuit 1323 may output the fourth reference clock signal RCLK4 as the sampling clock signal SCLK. Because the fourth reference clock signal RCLK4 has the rising edge at the fourth time t4, the first flip-flop FF1 may output the first feedback CA signal FCA1 having logic high (e.g., "1"), the second flip-flop FF2 may output the second feedback CA signal FCA2 having logic high (e.g., "1"), the third flip-flop FF3 may output the third feedback CA signal FCA3 having logic high (e.g., "1"), and the fourth flip-flop FF4 may output the fourth feedback CA signal FCA4 having logic low (e.g., "0"). Because the first to third feedback CA signals FCA1 to FCA3 are logic high (e.g., "1") and the fourth feedback CA signal FCA4 is logic low (e.g., "0"), the control logic circuit 1328 may generate the sum signal SUM of logic low (e.g., "0").

In the fifth detection step STEP5, the control logic circuit 1328 may set the second control signal CTRL2 such that the fifth reference clock signal RCLK5 is selected and may send the second control signal CTRL2 to the first training circuit 1323. The first training circuit 1323 may output the fifth reference clock signal RCLK5 as the sampling clock SCLK. Because the fifth reference clock signal RCLK5 has the rising edge at the fifth time t5, the first flip-flop FF1 may output the first feedback CA signal FCA1 having logic high (e.g., "1"), the second flip-flop FF2 may output the second feedback CA signal FCA2 having logic high (e.g., "1"), the third flip-flop FF3 may output the third feedback CA signal FCA3 having logic high (e.g., "1"), and the fourth flip-flop FF4 may output the fourth feedback CA signal FCA4 having logic low (e.g., "0"). Because the first to third feedback CA signals FCA1 to FCA3 are logic high (e.g., "1") and the fourth feedback CA signal FCA4 is logic low (e.g., "0"), the control logic circuit 1328 may generate the sum signal SUM of logic low (e.g., "0").

In the sixth detection step STEP6, the control logic circuit 1328 may set the second control signal CTRL2 such that the sixth reference clock signal RCLK6 is selected and may send the second control signal CTRL2 to the first training circuit 1323. The first training circuit 1323 may output the sixth reference clock signal RCLK6 as the sampling clock SCLK. Because the sixth reference clock signal RCLK6 has the rising edge at the sixth time t6, the first flip-flop FF1 may output the first feedback CA signal FCA1 having logic high (e.g., "1"), the second flip-flop FF2 may output the second feedback CA signal FCA2 having logic high (e.g., "1"), the third flip-flop FF3 may output the third feedback CA signal FCA3 having logic high (e.g., "1"), and the fourth flip-flop FF4 may output the fourth feedback CA signal FCA4 having logic low (e.g., "0"). Because the first to third feedback CA signals FCA1 to FCA3 are logic high (e.g., "1") and the fourth feedback CA signal FCA4 is logic low (e.g., "0"), the control logic circuit 1328 may generate the sum signal SUM of logic low (e.g., "0").

In the seventh detection step STEP7, the control logic circuit 1328 may set the second control signal CTRL2 such that the seventh reference clock signal RCLK7 is selected and may send the second control signal CTRL2 to the first training circuit 1323. The first training circuit 1323 may output the seventh reference clock signal RCLK7 as the sampling clock signal SCLK. Because the seventh reference clock signal RCLK7 has the rising edge at the seventh time t7, the first flip-flop FF1 may output the first feedback CA signal FCA1 having logic high (e.g., "1"), the second flip-flop FF2 may output the second feedback CA signal FCA2 having logic high (e.g., "1"), the third flip-flop FF3 may output the third feedback CA signal FCA3 having logic high (e.g., "1"), and the fourth flip-flop FF4 may output the fourth feedback CA signal FCA4 having logic high (e.g., "1"). Because the first to fourth feedback CA signals FCA1 to FCA4 are logic high (e.g., "1"), the control logic circuit 1328 may generate the sum signal SUM of logic high (e.g., "1").

In the eighth detection step STEP8, the control logic circuit 1328 may set the second control signal CTRL2 such that the eighth reference clock signal RCLK8 is selected and may send the second control signal CTRL2 to the first training circuit 1323. The first training circuit 1323 may output the eighth reference clock signal RCLK8 as the sampling clock SCLK. Because the eighth reference clock signal RCLK8 has the rising edge at the eighth time t8, the first flip-flop FF1 may output the first feedback CA signal FCA1 having logic high (e.g., "1"), the second flip-flop FF2 may output the second feedback CA signal FCA2 having logic high (e.g., "1"), the third flip-flop FF3 may output the third feedback CA signal FCA3 having logic high (e.g., "1"), and the fourth flip-flop FF4 may output the fourth feedback CA signal FCA4 having logic high (e.g., "1"). Because the first to fourth feedback CA signals FCA1 to FCA4 are logic high (e.g., "1"), the control logic circuit 1328 may generate the sum signal SUM of logic high (e.g., "1").

The training circuit 1320 may provide the operating circuit 1310 with the input signals IS being a bit stream composed of bit "1". The training circuit 1320 may check whether a bit error occurs, by sampling the output signals OS based on the plurality of reference clock signals RCLK1 to RCLK8 and performing the AND operation on the feedback CA signals FCA. Because the bit stream is composed of bit "1", a result (e.g., the sum signal SUM) that is obtained by performing, at the training circuit 1320, the AND operation on the feedback CA signals FCA may be "1". That is, when the sum signal SUM is "0", the training circuit 1320 may determine that a bit error occurs due to the erroneous sampling timing for the output signals OS. That is, the sum signal SUM may refer to a signal indicating whether a bit error occurs in the feedback CA signals. A reference clock corresponding to a detection step where the sum signal SUM is "1" may be employed as the first training clock signal TCLK1 that is used to sample the output signals OS.

The control logic circuit 1328 may select a reference clock signal corresponding to a detection step where the sum signal SUM is "1", as the first training clock signal TCLK1. For example, the control logic circuit 1328 may select one of the plurality of reference clock signal RCLK as the first training clock signal TCLK1 based on the sum signals SUM of the plurality of detection steps, which are stored in the register 1328_3. Because the sum signal SUM of each of the seventh and eighth detection steps STEP7 and STEP8 is "1", the control logic circuit 1328 may select one of the seventh reference clock RCLK7 and the eighth reference clock signal RCLK8 as the first training clock signal TCLK1.

In an example embodiment, the control logic circuit 1328 may select the earliest reference clock signal among reference clock signals corresponding to detection steps where the sum signal SUM is "1", as the first training clock signal TCLK1. For example, the control logic circuit 1328 may select the seventh reference clock signal RCLK7 as the first training clock signal TCLK1.

In an example embodiment, when there is a detection step where the sum signal SUM is "1", the control logic circuit 1328 may not perform a next detection step. For example, because the sum signal SUM is "1" in the seventh detection step STEP7, the control logic circuit 1328 may select the seventh reference clock signal RCLK7 as the first training clock signal TCLK1 and may not perform the eighth detection step STEP8.

As described above, the operating circuit 1310 may output the output signals OS having different delays. The training circuit 1320 may perform the first training operation for the purpose of searching for a coarse clock for sampling the output signals OS without the bit error. Through the plurality of detection steps STEP1 to STEP8, the training circuit 1320 may select one of the plurality of reference clock signals RCLK1 to RCLK8 as the first training clock signal TCLK1.

Figure 8:
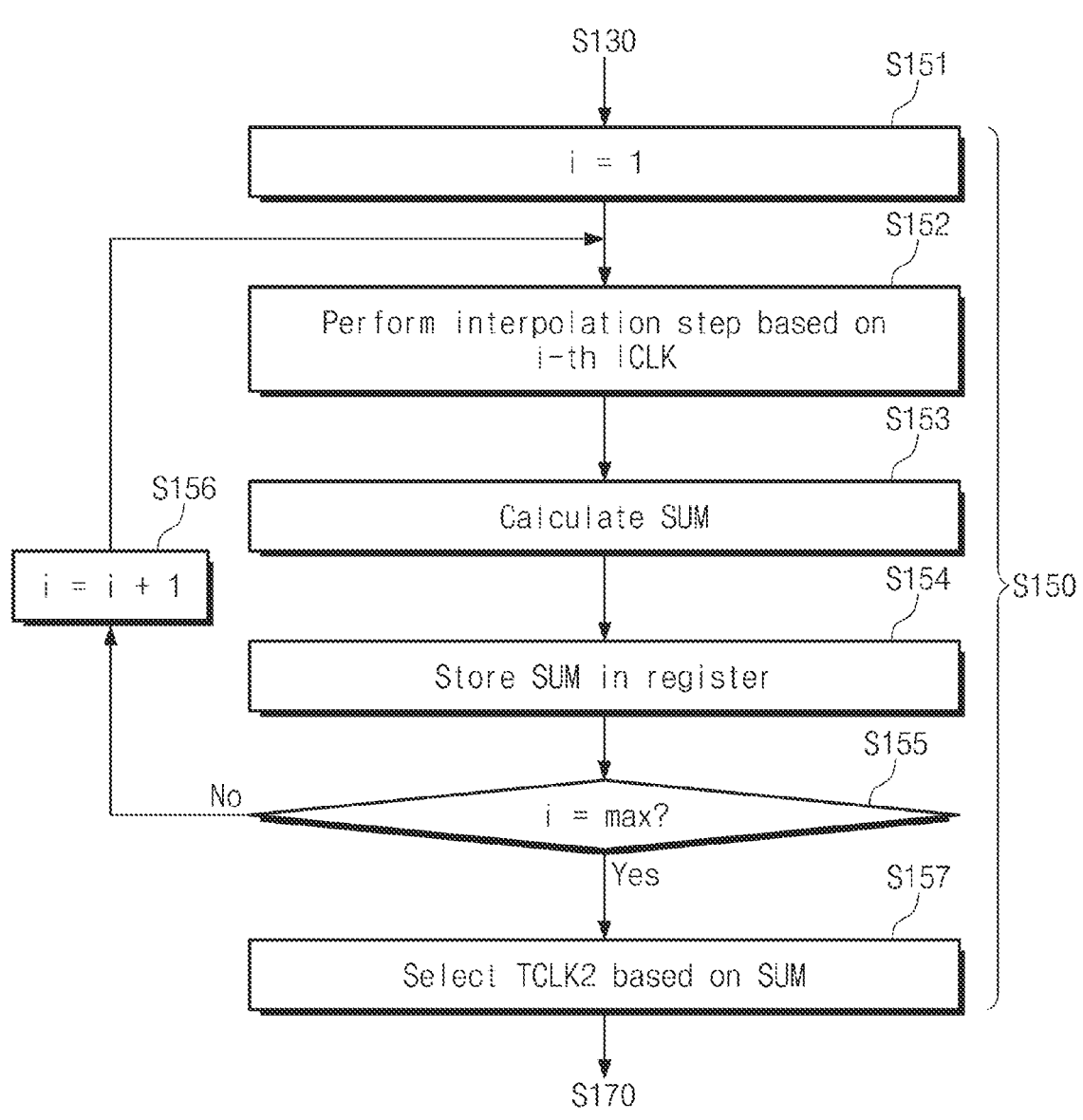
FIG. 8 is a flowchart illustrating the operation S150 of FIG. 5 in detail.

FIG. 8 is a flowchart illustrating operation S150 of FIG. 5 in detail. The second training operation of the register clock driver 1300 will be described with reference to FIG. 8. Referring to FIGS. 2, 5, and 8, operation S150 may include operation S151 to operation S157. In operation S151, a variable "i" may be set to "1". In an example embodiment, the variable "i" is used to describe an interpolation step that is repeatedly performed, and the present disclosure is not limited thereto.

In operation S152, the register clock driver 1300 may perform an i-th interpolation step ISTEP1 based on an i-th interpolation clock signal ICLKi. The register clock driver 1300 may perform the second training operation based on the first training clock signal TCLK1 selected in the first training operation. Because the seventh reference clock signal RCLK7 among the plurality of reference clock signals RCLK is selected as the first training clock signal TCLK1 in the first training operation, the control logic circuit 1328 may set the second control signal CTRL2 such that the seventh reference clock signal RCLK7 is selected. The first training circuit 1323 may output the seventh reference clock signal RCLK7 as the sampling clock signal SCLK in response to the second control signal CTRL2.

The control logic circuit 1328 may set the third control signal CTRL3 such that the second training circuit 1324 generates the i-th interpolation clock signal ICLKi. The second training circuit 1324 may generate and output the i-th interpolation clock signal ICLKi based on the sampling clock signal SCLK in response to the third control signal CTRL3. The output circuit 1325 may sample the output signals OS based on the i-th interpolation clock signal ICLKi. The control logic circuit 1328 may receive the sampled feedback CA signals FCA. In operation S153, the register clock driver 1300 may calculate the sum signal SUM. For example, the control logic circuit 1328 may generate the sum signal SUM by performing a logical operation (e.g., an AND operation) on the received feedback CA signals FCA. A detection step will be described in detail with reference to FIG. 9.

In operation S154, the register clock driver 1300 may store the sum signal SUM in the register 1328_3. For example, the control logic circuit 1328 may store the sum signal SUM in the shift register. Alternatively, the control logic circuit 1328 may store the sum signal SUM and the variable "i" in the register 1328_3.

In operation S155, whether the variable "i" is a maximum value (e.g., an interpolation count of the parameters used in the second training operation) is determined. When the variable "i" is not the maximum value, in operation S156, the variable "i" increases as much as "1". Afterwards, the register clock driver 1300 may perform operation S152. The register clock driver 1300 may repeatedly perform the interpolation step.

When all the interpolation steps are performed (i.e., Yes in operation S155), the register clock driver 1300 may perform operation S157. In operation S157, the register clock driver 1300 may select the second training clock signal TCLK2 based on the sum signal SUM. For example, the control logic circuit 1328 may select one of the interpolation clock signals ICLK corresponding to interpolation steps where the sum signal SUM is "1 as the second training clock signal TCLK2.

Figure 9:
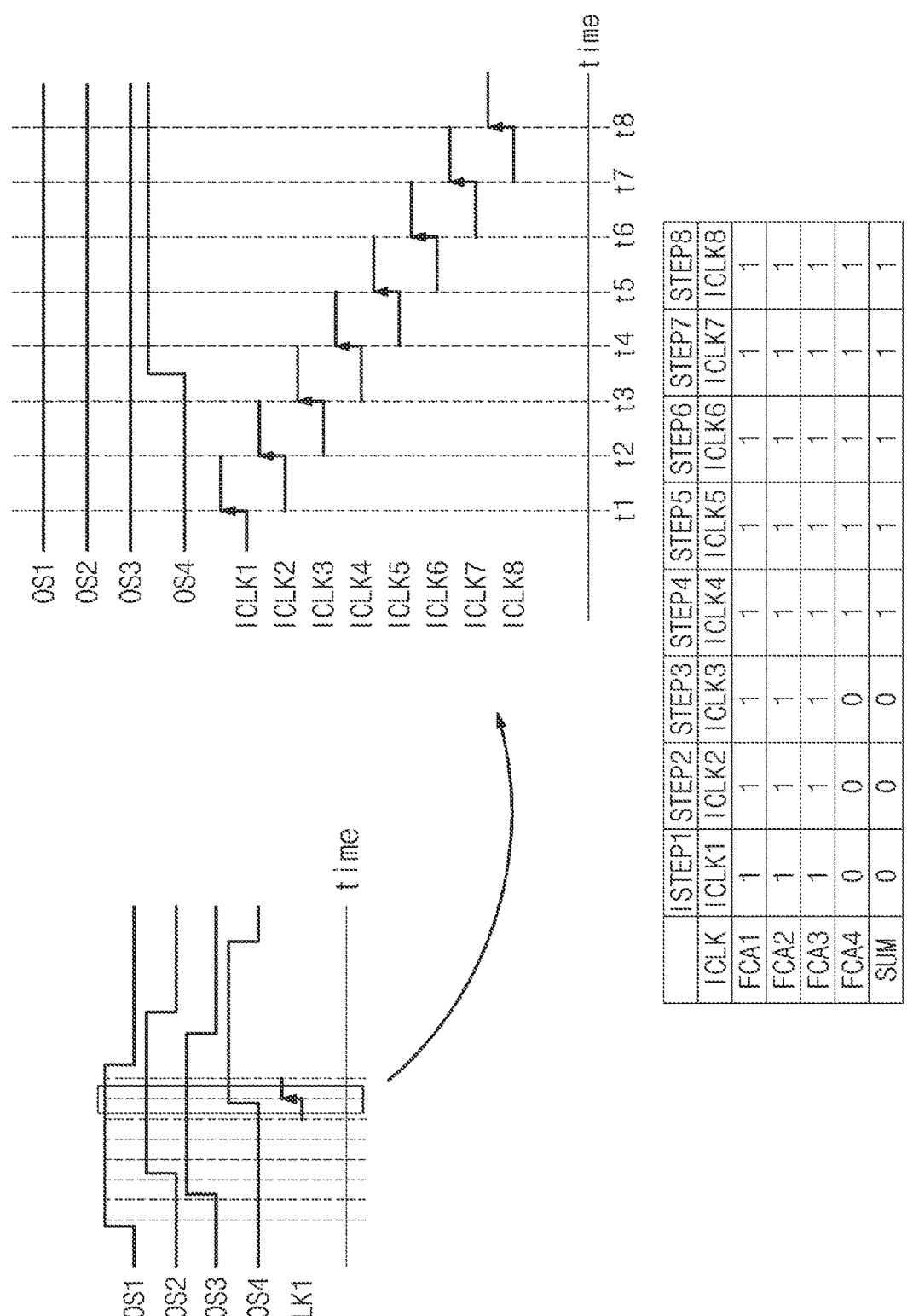
FIG. 9 is a diagram for describing a second training operation of FIG. 2.

FIG. 9 is a diagram for describing a second training operation of FIG. 2. Referring to FIGS. 3, 8, and 9, the first output signal OS1 to the third output signal OS3 may be logic high from a first time t1 to an eighth time t8, and the fourth output signal OS4 may transition from logic low to logic high in a time period from t3 to t4.

In an example embodiment, the first training clock signal TCLK1 may be identical in phase to the fifth interpolation clock signal ICLK5. The second training circuit 1324 may set a default interpolation section based on the first training clock signal TCLK1 for the purpose of searching for the fastest clock capable of sampling data. The interpolation section may refer to a period where the interpolation clock signals ICLK generated based on the first training clock signal TCLK1 have the rising edge. For example, the default interpolation section may have a length of a first time period T1 that starts prior to a time when the first training clock signal TCLK1 has the rising edge. The default interpolation section may be from the first time t1 to the eighth time t8.

In an example embodiment, in the second training operation, as described with reference to FIG. 7A, the control logic circuit 1328 may generate and output the pattern "P" including the bit stream composed of bit "1" and may set the first control signal CTRL1 to logic high such that the pattern "P" is selected. The selecting circuit 1322 may output the pattern "P" in response to the first control signal CTRL1. The operating circuit 1310 may receive the input signals IS and may output the output signals OS.

Because the seventh reference clock signal RCLK7 is selected as the first training clock TCLK1 in the first training operation, the control logic circuit 1328 may set the second control signal CTRL2 such that the seventh reference clock signal RCLK7 is selected. The first training circuit 1323 may output the seventh reference clock signal RCLK7 as the sampling clock signal SCLK in response to the second control signal CTRL2.

The register clock driver 1300 may repeatedly perform the interpolation step in the second training operation. It is assumed that the variable "i" is "8". However, the present disclosure is not limited thereto. For example, the number of interpolation steps to be performed may increase or decrease depending on the specific implementation under consideration. The register clock driver 1300 may perform first to eighth interpolation steps ISTEP1 to ISTEP8. In the first interpolation step ISTEP1, the control logic circuit 1328 may set the third control signal CTRL3. The control logic circuit 1328 may set the third control signal CTRL3 such that there is generated the first interpolation clock signal ICLK1 having the rising edge at the first time t1 through the phase interpolation based on the first training clock signal TCLK1. The third control signal CTRL3 may include a code "CODE" indicating a phase difference of the first training clock signal TCLK1 and the first interpolation clock signal ICLK1.

The second training circuit 1324 may generate the first interpolation clock signal ICLK1 through the phase interpolation based on the sampling clock signal SCLK (e.g., the first training clock TCLK1) in response to the third control signal CTRL3. The second training circuit 1324 may output the first interpolation clock signal ICLK1 to the output circuit 1325.

The output circuit 1325 may receive the first interpolation clock signal ICLK1 and the output signals OS and may output the feedback CA signals FCA to the control logic circuit 1328. Because the first interpolation clock signal ICLK1 has the rising edge at the first time t1, the first to third flip-flops FF1 to FF3 may respectively output the first to third feedback CA signals FCA1 to FCA3 having logic high (e.g., "1"), and the fourth flip-flop FF4 may output the fourth feedback CA signal FCA4 having logic low (e.g., "0").

The control logic circuit 1328 may receive the feedback CA signals FCA1 to FCA4, and the control logic circuit 1328 may generate the sum signal SUM by performing a logical operation on the feedback CA signals FCA1 to FCA4. Because the first to third feedback CA signals FCA1 to FCA3 are logic high (e.g., "1") and the fourth feedback CA signal FCA4 is logic low (e.g., "0"), the sum signal SUM of the first interpolation step ISTEP1 may be logic low (e.g., "0"). The control logic circuit 1328 may store the sum signal SUM of the first interpolation step ISTEP1 in the register 1328_3.

In the second interpolation step ISTEP2, the control logic circuit 1328 may set the third control signal CTRL3. The control logic circuit 1328 may set the third control signal CTRL3 such that there is generated the second interpolation clock signal ICLK2 having the rising edge at the second time t2 through the phase interpolation based on the first training clock signal TCLK1. The third control signal CTRL3 may include the code "CODE" indicating a phase difference of the first training clock signal TCLK1 and the second interpolation clock signal ICLK2.

The second training circuit 1324 may generate the second interpolation clock signal ICLK2 through the phase interpolation based on the sampling clock signal SCLK (e.g., the first training clock TCLK1) in response to the third control signal CTRL3. The second training circuit 1324 may output the second interpolation clock signal ICLK2 to the output circuit 1325.

The output circuit 1325 may receive the second interpolation clock signal ICLK2 and the output signals OS and may output the feedback CA signals FCA to the control logic circuit 1328. Because the second interpolation clock signal ICLK2 has the rising edge at the second time t2, the first to third flip-flops FF1 to FF3 may respectively output the first to third feedback CA signals FCA1 to FCA3 having logic high (e.g., "1"), and the fourth flip-flop FF4 may output the fourth feedback CA signal FCA4 having logic low (e.g., "0").

The control logic circuit 1328 may receive the feedback CA signals FCA1 to FCA4, and the control logic circuit 1328 may generate the sum signal SUM by performing a logical operation on the feedback CA signals FCA1 to FCA4. Because the first to third feedback CA signals FCA1 to FCA3 are logic high (e.g., "1") and the fourth feedback CA signal FCA4 is logic low (e.g., "0"), the sum signal SUM of the second interpolation step ISTEP2 may be logic low (e.g., "0"). The control logic circuit 1328 may store the sum signal SUM of the second interpolation step ISTEP2 in the register 1328_3. The remaining interpolation steps ISTEP3 to ISTEP8 are similar to the above description, and thus, additional description will be omitted to avoid unnecessary redundancy.

In the third interpolation step ISTEP3, the second training circuit 1324 may output the third interpolation clock signal ICLK3 having the rising edge at the third time t3 to the output circuit 1325. The first to third flip-flops FF1 to FF3 may respectively output the first to third feedback CA signals FCA1 to FCA3 having logic high (e.g., "1"), and the fourth flip-flop FF4 may output the fourth feedback CA signal FCA4 having logic low (e.g., "0"). Because the first to third feedback CA signals FCA1 to FCA3 are logic high (e.g., "1") and the fourth feedback CA signal FCA4 is logic low (e.g., "0"), the sum signal SUM of the third interpolation step ISTEP3 may be logic low (e.g., "0").

In the fourth interpolation step ISTEP4, the second training circuit 1324 may output the fourth interpolation clock signal ICLK4 having the rising edge at the fourth time t4 to the output circuit 1325. The first to fourth flip-flops FF1 to FF4 may respectively output the first to fourth feedback CA signals FCA1 to FCA4 having logic high (e.g., "1"). Because the first to fourth feedback CA signals FCA1 to FCA4 are logic high (e.g., "1"), the sum signal SUM of the fourth interpolation step ISTEP4 may be logic high (e.g., "1").

In the fifth interpolation step ISTEP5, the second training circuit 1324 may output the fifth interpolation clock signal ICLK5 having the rising edge at the fifth time t5 to the output circuit 1325. The first to fourth flip-flops FF1 to FF4 may respectively output the first to fourth feedback CA signals FCA1 to FCA4 having logic high (e.g., "1"). Because the first to fourth feedback CA signals FCA1 to FCA4 are logic high (e.g., "1"), the sum signal SUM of the fifth interpolation step ISTEP5 may be logic high (e.g., "1").

In the sixth interpolation step ISTEP6, the second training circuit 1324 may output the sixth interpolation clock signal ICLK6 having the rising edge at the sixth time t6 to the output circuit 1325. The first to fourth flip-flops FF1 to FF4 may respectively output the first to fourth feedback CA signals FCA1 to FCA4 having logic high (e.g., "1"). Because the first to fourth feedback CA signals FCA1 to FCA4 are logic high (e.g., "1"), the sum signal SUM of the sixth interpolation step ISTEP6 may be logic high (e.g., "1").

In the seventh interpolation step ISTEP7, the second training circuit 1324 may output the seventh interpolation clock signal ICLK7 having the rising edge at the seventh time t7 to the output circuit 1325. The first to fourth flip-flops FF1 to FF4 may respectively output the first to fourth feedback CA signals FCA1 to FCA4 having logic high (e.g., "1"). Because the first to fourth feedback CA signals FCA1 to FCA4 are logic high (e.g., "1"), the sum signal SUM of the seventh interpolation step ISTEP7 may be logic high (e.g., "1").

In the eighth interpolation step ISTEP8, the second training circuit 1324 may output the eighth interpolation clock signal ICLK8 having the rising edge at the eighth time t8 to the output circuit 1325. The first to fourth flip-flops FF1 to FF4 may respectively output the first to fourth feedback CA signals FCA1 to FCA4 having logic high (e.g., "1"). Because the first to fourth feedback CA signals FCA1 to FCA4 are logic high (e.g., "1"), the sum signal SUM of the eighth interpolation step ISTEP8 may be logic high (e.g., "1").

The control logic circuit 1328 may select an interpolation clock corresponding to an interpolation step where the sum signal SUM is "1", as the second training clock TCLK2. For example, the control logic circuit 1328 may select one of the plurality of interpolation clock signals ICLK as the second training clock signal TCLK2 based on the sum signals SUM of the plurality of interpolation steps, which are stored in the register 1328_3. Because the sum signal SUM of each of the fourth to eighth interpolation steps ISTEP4 to STEP8 is "1", the control logic circuit 1328 may select one of the fourth to eighth interpolation clocks ICLK4 to ICLK8 as the second training clock TCLK2.

In an example embodiment, the control logic circuit 1328 may select the earliest interpolation clock among interpolation clock signals corresponding to interpolation steps where the sum signal SUM is "1", as the second training clock TCLK2. For example, the control logic circuit 1328 may select the fourth interpolation clock ICLK4 as the second training clock TCLK2.

The control logic circuit 1328 may store the training result. The control logic circuit 1328 may store a value of the second control signal CTRL2 corresponding to the seventh reference clock signal RCLK7 in the register 1328_3 or the memory. The control logic circuit 1328 may store a value (or a code) of the third control signal CTRL3 corresponding to the fourth interpolation clock signal ICLK4 in the register 1328_3 or the memory.

After the initialization operation is completed, in the normal operation, the control logic circuit 1328 may sample the output signals OS based on the second training clock signal TCLK2 and may output the output CA signals OCA to the memory devices 1400. The control logic circuit 1328 may set the first control signal CTRL1 to logic low such that the CA signals CA are selected. The control logic circuit 1328 may set the second control signal CTRL2 based on the training result such that the seventh reference clock signal RCLK7 is selected in the first training circuit 1323. The control logic circuit 1328 may set the third control signal CTRL3 based on the training result such that the fourth interpolation clock signal ICLK4 is output from the second training circuit 1324. Because the register clock driver 1300 samples the output signals OS based on the second training clock signal TCLK2, the register clock driver 1300 may output the synchronized output CA signals OCA to the memory devices 1400 without the bit error.

In an example embodiment, when there is an interpolation step where the sum signal SUM is "1", the control logic circuit 1328 may not perform a next interpolation step. For example, because the sum signal SUM is "1" in the fourth interpolation step ISTEP4, the control logic circuit 1328 may select the fourth interpolation clock signal ICLK4 as the second training clock signal TCLK2 and may not perform the fifth to eighth interpolation steps ISTEP5 to ISTEP8.

As described above, the operating circuit 1310 may output the output signals OS having different delays. The training circuit 1320 may perform the second training operation for the purpose of searching for a finer clock signal for sampling the output signals OS without the bit error. Through the plurality of interpolation steps ISTEP1 to ISTEP8, the training circuit 1320 may select one of the plurality of interpolation clock signals ICLK1 to ICLK8 as the second training clock signal TCLK2.

Figure 10:
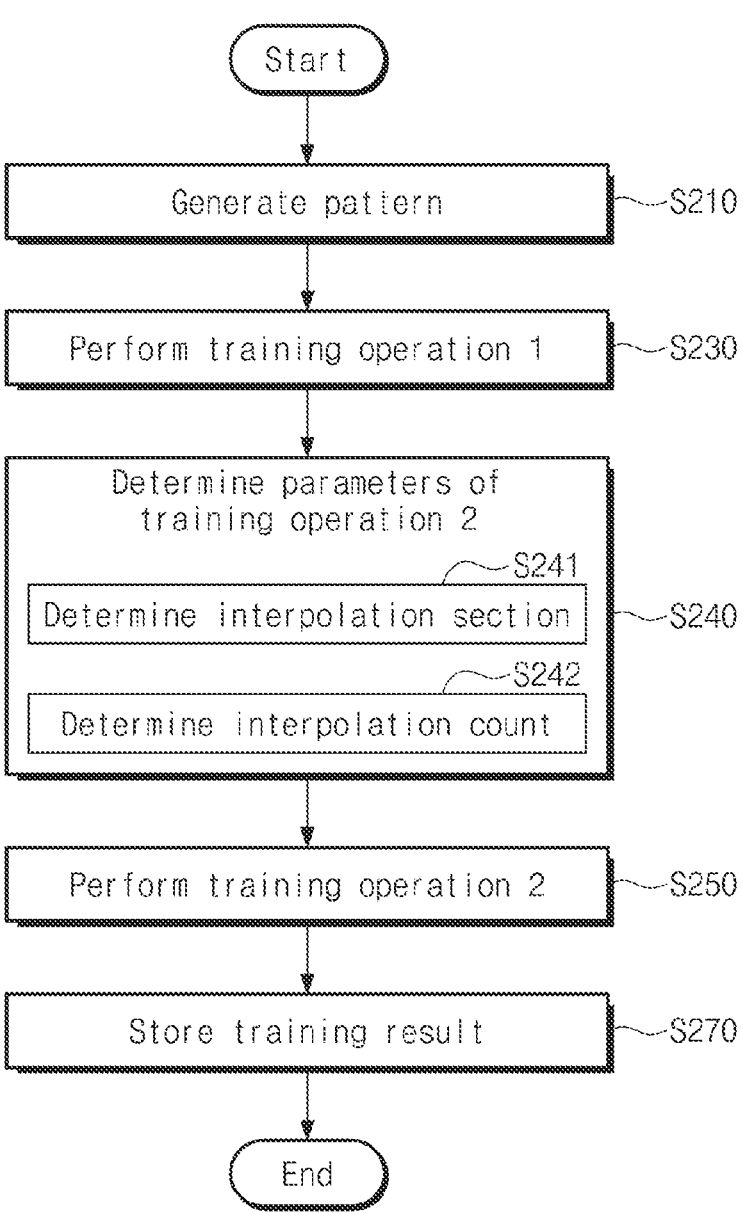
FIG. 10 is a flowchart illustrating an example of an operation of a register clock driver of FIG. 1.

FIG. 10 is a flowchart illustrating an example of an operation of a register clock driver of FIG. 1. Referring to FIGS. 2, 5, and 10, in operation S210, the register clock driver 1300 may generate the pattern "P". In operation S230, the register clock driver 1300 may perform the first training operation. Operation S210 and operation S230 are identical or similar to operation S110 and operation S130 of FIG. 5, and thus, additional description will be omitted to avoid redundancy.

In operation S240, the register clock driver 1300 may determine parameters of the second training operation. For example, the parameters of the second training operation may include an interpolation section and an interpolation count. The interpolation section may refer to a period where the interpolation clock signals ICLK generated based on the first training clock TCLK1 have the rising edge. The interpolation count may refer to the number of interpolation clock signal ICLK generated in the second training operation or the number of interpolation steps repeatedly performed in the second training operation. Operation S240 may include operation S241 and operation S242.

In operation S241, the register clock driver 1300 may determine the interpolation section. For example, the register clock driver 1300 may generate the interpolation clock signals ICLK having the rising edge within the interpolation section based on the first training clock signal TCLK1. The interpolation section will be described in detail with reference to FIG. 11.

In operation S242, the register clock driver 1300 may determine the interpolation count. For example, the register clock driver 1300 may generate the interpolation clock signals ICLK based on the interpolation count and may repeatedly perform the interpolation step as much as the number of times corresponding to the interpolation count. The interpolation count will be described in detail with reference to FIGS. 12A and 12B.

In operation S250, the register clock driver 1300 may perform the second training operation. The register clock driver 1300 may perform the second training operation based on the parameters of the second training operation. In operation S270, the register clock driver 1300 may store a training result in the register 1328_3 or a memory. Operation S250 and operation S270 are identical or similar to operation S150 and operation S170 of FIG. 5, and thus, additional description will be omitted to avoid redundancy.

Figure 11:
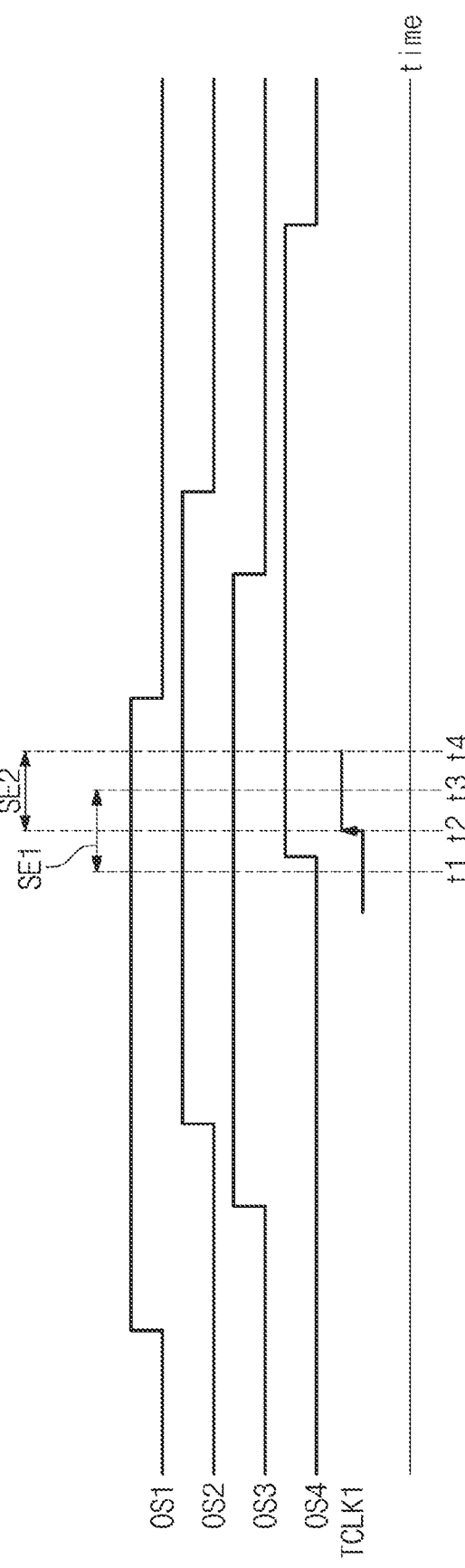
FIG. 11 is a drawing for describing operation S241 of FIG. 10.

FIG. 11 is a drawing for describing operation S241 of FIG. 10. Referring to FIGS. 10 and 11, the register clock driver 1300 may determine the interpolation section. The register clock driver 1300 may set the interpolation section of the second training operation to a first time period SE1. Alternatively, the interpolation section of the second training operation may be determined in advance to be the first time period SE1. That is, the first time period SE1 may be a default interpolation section. When the interpolation section is the first time period SE1, some of the interpolation clock signals ICLK1 to ICLK8 generated by the second training circuit 1324 may be advanced with respect to the first training clock signal TCLK1, and the other interpolation clock signals ICLK1 to ICLK8 may be delayed with respect to the first training clock signal TCLK1 or may be identical to the first training clock TCLK1. The first training clock TCLK1 may transition from logic low to logic high at a second time t2. In other words, the first training clock signal TCLK1 may have the rising edge at the second time t2. The interpolation clock signals ICLK1 to ICLK8 may have the rising edge in a time period from t1 to t3 (i.e., in the first time period SE1).

The register clock driver 1300 may adjust the interpolation section of the second training operation. The register clock driver 1300 may change the interpolation section of the second training operation so as to be different from the first time period SE1 determined in advance. For example, when an operation is not normally performed based on the second training clock signal TCLK2 determined in the first time period SE1, the register clock driver 1300 may set the interpolation section of the second training operation to a second time period SE2 for the purpose of securing a margin.

When the interpolation section is the second time period SE2, the interpolation clock signals ICLK1 to ICLK8 generated by the second training circuit 1324 may be delayed with respect to the first training clock signal TCLK1 or may be identical to the first training clock signal TCLK1. The interpolation clock signals ICLK1 to ICLK8 may have the rising edge in a time period from t2 to t4 (i.e., in the second time period SE2).

Figure 12A:
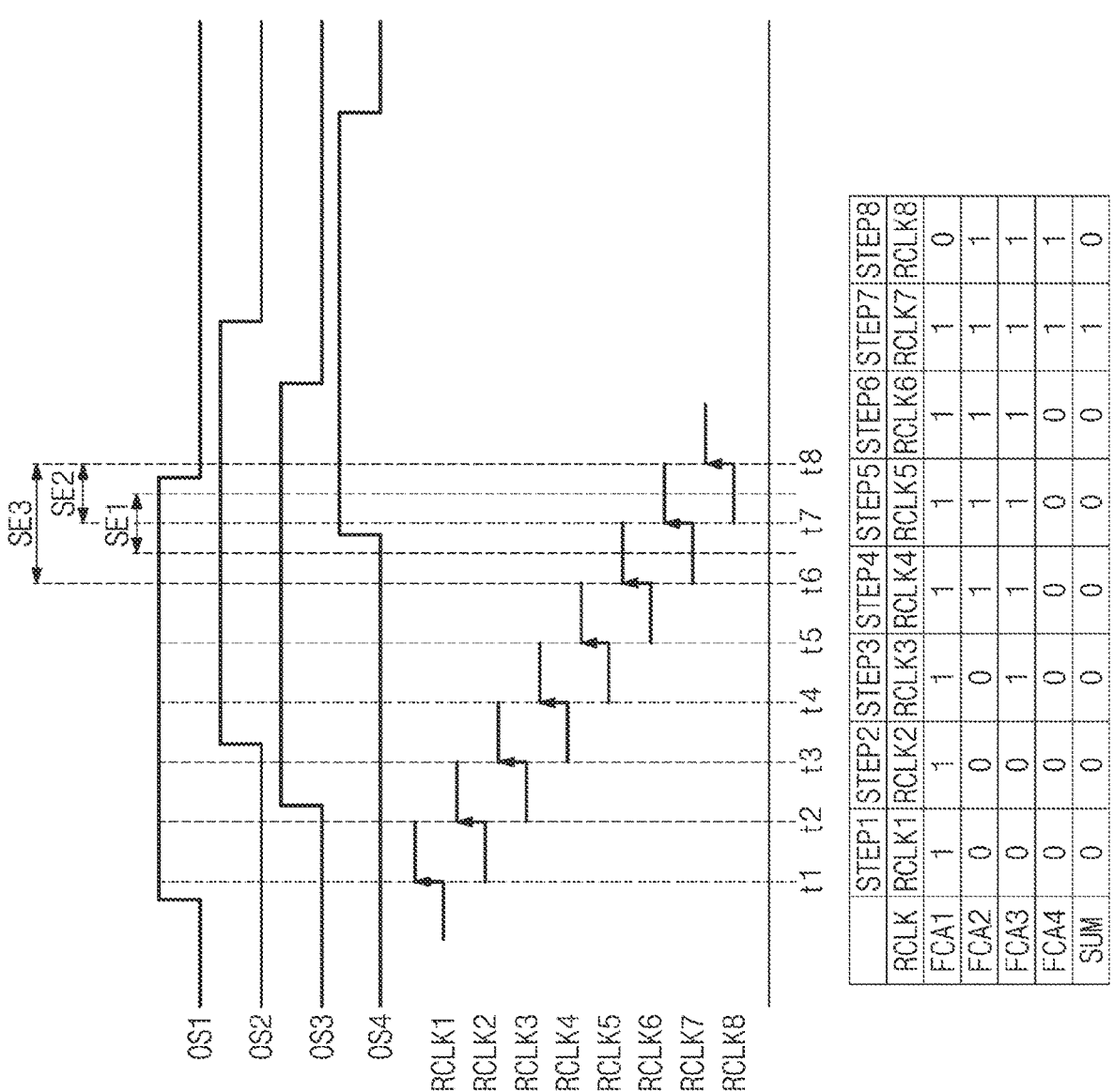
FIGS. 12A and 12B are diagrams for describing operation S240 of FIG. 10.
Figure 12B:
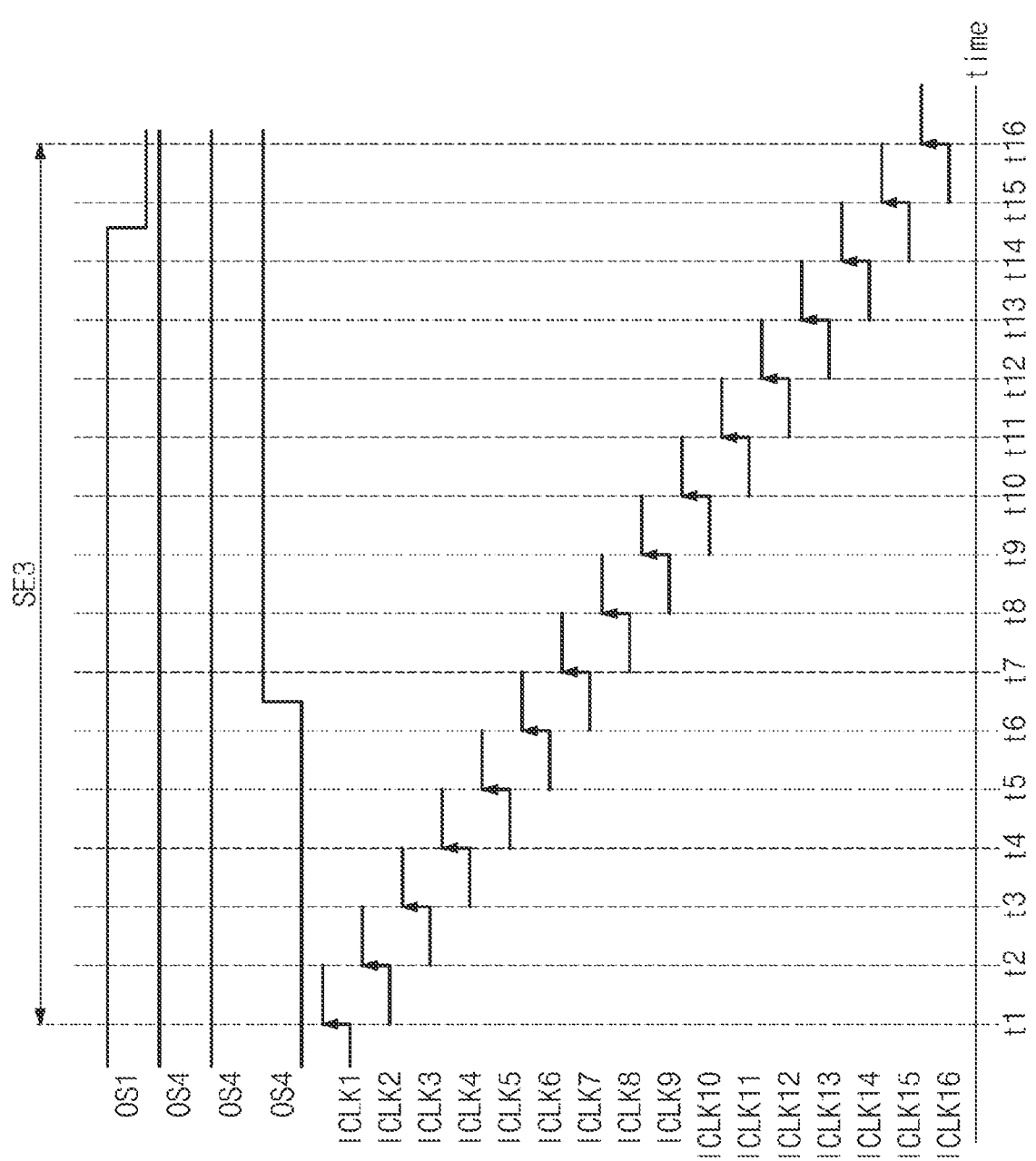

FIGS. 12A and 12B are diagrams for describing operation S240 of FIG. 10. Referring to FIGS. 10 and 12A, the register clock driver 1300 may determine the parameters of the second training operation based on a result of the first training operation. The register clock driver 1300 may determine the parameters of the second training operation based on the number of detection steps where the sum signal SUM is "1", which is determined in the first training operation. That is, the register clock driver 1300 may determine the interpolation section and the interpolation count based on a pass step count. For example, when the pass step count is "2", the register clock driver 1300 may set the interpolation section to the first time period SE1 and may set the interpolation count to "8". When the pass step count is "1", the register clock driver 1300 may set the interpolation section to a third time period SE3 and may set the interpolation count to "16".

For example, the first output signal OS1 may transition from logic low to logic high before a first time t1; the second output signal OS2 may transition from logic low to logic high between a third time t3 and a fourth time t4; the third output signal OS3 may transition from logic low to logic high between a second time t2 and the third time t3; the fourth output signal OS4 may transition from logic low to logic high between a sixth time t6 and a seventh time t7. The first output signal OS1 may transition from logic high to logic low in a time period from t7 to t8, and the second to fourth output signals OS2 to OS4 may transition from logic high to logic low after an eighth time t8.

The first reference clock signal RCLK1 may have a rising edge at the first time t1; the second reference clock signal RCLK2 may have a rising edge at the second time t2; the third reference clock signal RCLK3 may have a rising edge at the third time t3; the fourth reference clock signal RCLK4 may have a rising edge at the fourth time t4; the fifth reference clock signal RCLK5 may have a rising edge at the fifth time t5; the sixth reference clock signal RCLK6 may have a rising edge at the sixth time t6; the seventh reference clock signal RCLK7 may have a rising edge at the seventh time t7; and, the eighth reference clock signal RCLK8 may have a rising edge at the eighth time t8.

The first to seventh detection steps STEP1 to STEP7 of FIG. 12A are identical or similar to the first to seventh detection steps STEP1 to STEP7 of FIG. 7B, and thus, additional description will be omitted to avoid redundancy. In the eighth detection step STEP8, at the eighth time t8, the first output signal OS1 may be logic low (e.g., "0"), the second output signal OS2 may be logic high (e.g., "1"), the third output signal OS3 may be logic high (e.g., "1"), and the fourth output signal OS4 may be logic high (e.g., "1"). The first flip-flop FF1 may output the first feedback CA signal FCA1 having logic low (e.g., "0"), the second flip-flop FF2 may output the second feedback CA signal FCA2 having logic high (e.g., "1"), the third flip-flop FF3 may output the third feedback CA signal FCA3 having logic high (e.g., "1"), and the fourth flip-flop FF4 may output the fourth feedback CA signal FCA4 having logic high (e.g., "1"). Because the first feedback CA signal FCA1 is logic low (e.g., "0") and the second to fourth feedback CA signals FCA2 to FCA4 are logic high (e.g., "1"), the sum signal SUM may be logic low (e.g., "0").

As such, in the first training operation, a clock signal corresponding to a detection step where the sum signal SUM is "1" may be only the seventh reference clock signal RCLK7. That is, the pass step count may be "1". The control logic circuit 1328 may determine the seventh reference clock signal RCLK7 as the first training clock signal TCLK1. When the pass step count is "1", the control logic circuit 1328 may set the interpolation section to the third time period SE3 and may set the interpolation count to "16".

In a further example embodiment, like the description given with reference to FIG. 11, the register clock driver 1300 may set the interpolation section of the second training operation to the second time period SE2 for the purpose of securing the margin.

Referring to FIG. 12B, the register clock driver 1300 may perform the second training operation based on the first training clock signal TCLK1. Because the interpolation section is the third time period SE3, the register clock driver 1300 may generate the interpolation clock signal ICLK having the rising edge in the third time period SE3. Because the interpolation count is "16", the register clock driver 1300 may generate 16 interpolation counts ICLK1 to ICLK16. The register clock driver 1300 may perform first to sixteenth interpolation steps ISTEP1 to ISTEP16.

For example, the second training circuit 1324 may generate the first interpolation clock signal ICLK1 having the rising edge at the first time t1 in the first interpolation step ISTEP1, may generate the second interpolation clock signal ICLK2 having the rising edge at the second time t2 in the second interpolation step ISTEP2, may generate the third interpolation clock signal ICLK3 having the rising edge at the third time t3 in the third interpolation step ISTEP3, and may generate the fourth interpolation clock signal ICLK4 having the rising edge at the fourth time t4 in the fourth interpolation step ISTEP4. The remaining interpolation clock signals ICLK5 to ICLK16 may be generated in a manner similar to the above description, and thus, additional description will be omitted to avoid redundancy.

Figure 13:
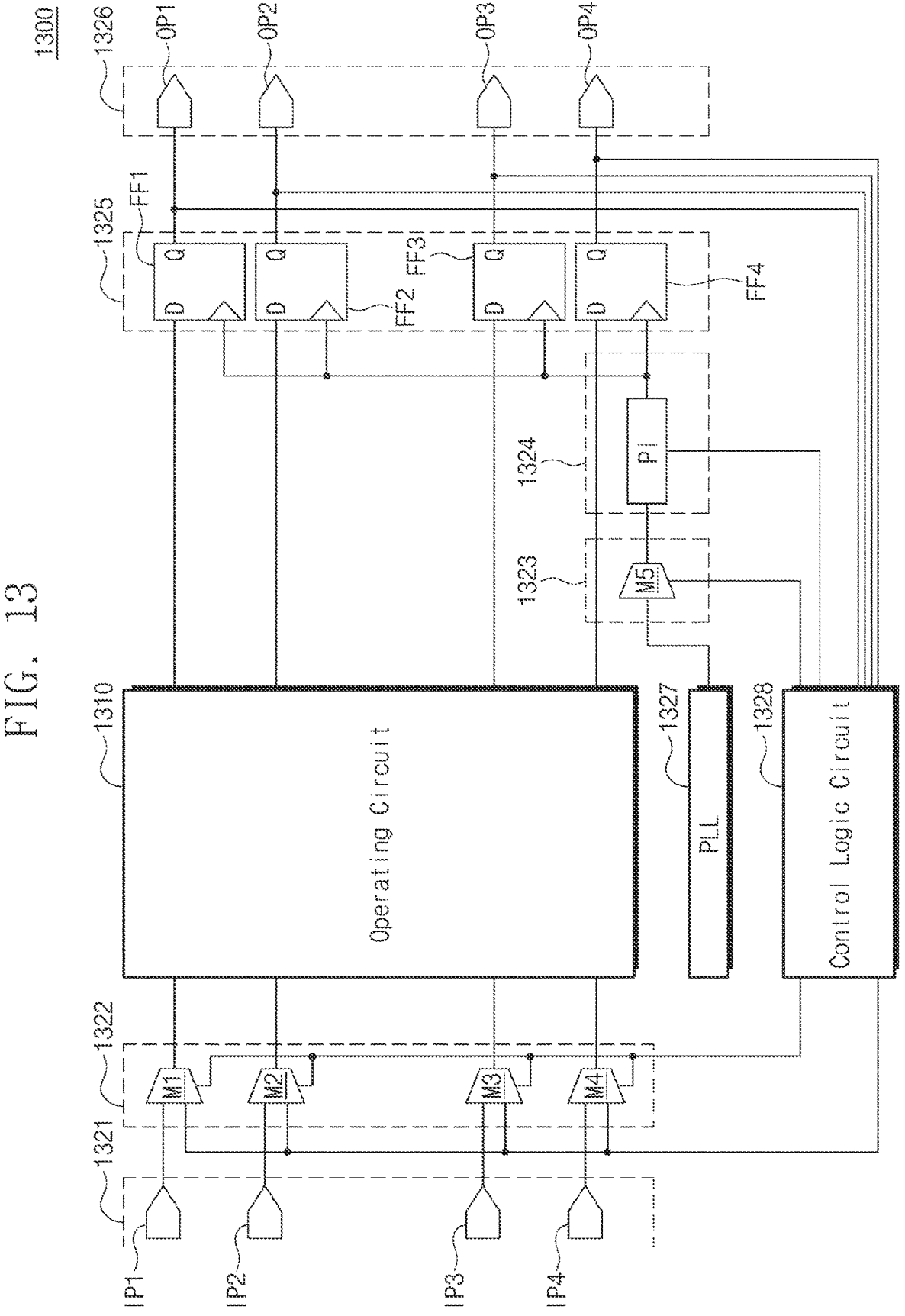
FIG. 13 is a block diagram illustrating a register clock driver of FIG. 1 in detail.

FIG. 13 is a block diagram illustrating a register clock driver of FIG. 1 in detail. An example embodiment of the register clock driver 1300 will be described with reference to FIG. 13. Referring to FIGS. 1, 2, and 13, the CA input pin 1321, the selecting circuit 1322, the output circuit 1325, the CA output pin 1326, the phase locked loop 1327, and the control logic circuit 1328 of FIG. 13 are identical or similar to the CA input pin 1321, the selecting circuit 1322, the output circuit 1325, the CA output pin 1326, the phase locked loop 1327, and the control logic circuit 1328 of FIG. 3, and thus, additional description will be omitted to avoid redundancy.

The first training circuit 1323 may include a fifth multiplexer M5, and the second training circuit 1324 may include a phase interpolator PI. The fifth multiplexer M5 may receive the first to eighth reference clock signals RCLK1 to RCLK8 and the second control signal CTRL2. The fifth multiplexer M5 may select one of the first to eighth reference clock signals RCLK1 to RCLK8 in response to the second control signal CTRL2. The fifth multiplexer M5 may output one selected from the first to eighth reference clock signals RCLK1 to RCLK8 as the sampling clock signal SCLK. The fifth multiplexer M5 may output the sampling clock signal SCLK to the phase interpolator PI.

The second training circuit 1324 may generate the interpolation clock signal ICLK through the phase interpolation based on the sampling clock signal SCLK and the third control signal CTRL3. For example, the phase interpolator PI may receive the sampling clock signal SCLK from the fifth multiplexer M5 and may receive the third control signal CTRL3 from the control logic circuit 1328. The phase interpolator PI may generate the interpolation clock signal ICLK by adjusting the phases of the sampling clock signal SCLK based on the third control signal CTRL3. The phase interpolator PI may output the interpolation clock signal ICLK to the first flip-flop FF1 to the fourth flip-flop FF4.

Figure 14:
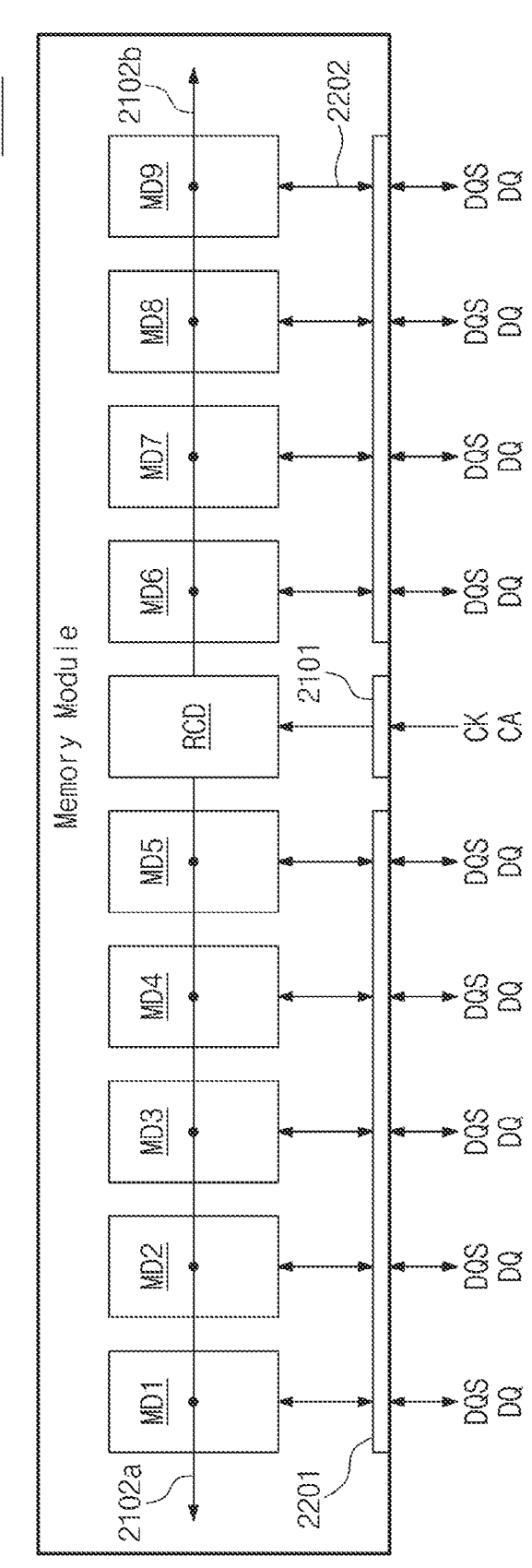
FIGS. 14 and 15 are block diagrams illustrating memory modules according to example embodiments of the present disclosure.
Figure 15:
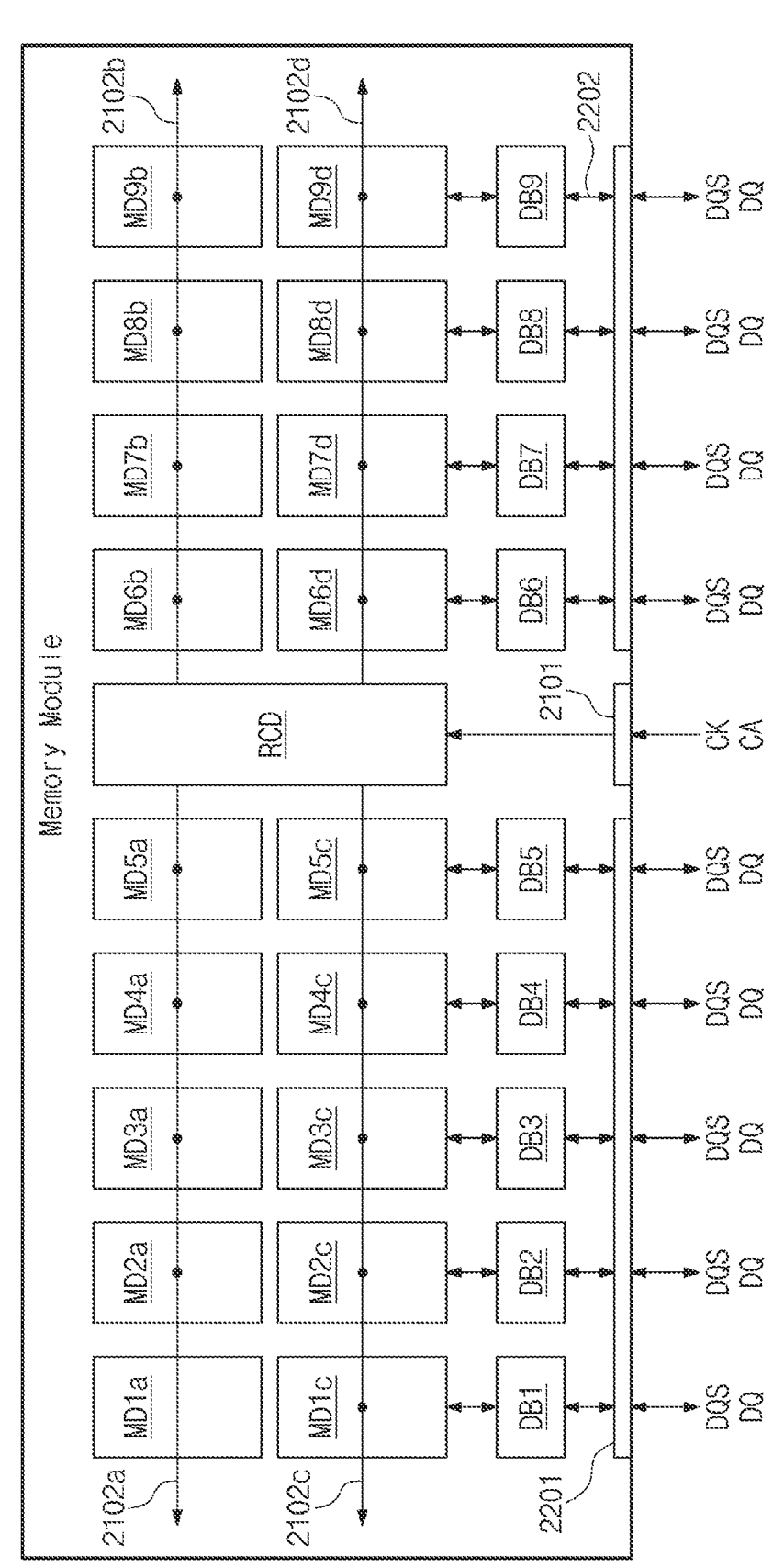

FIGS. 14 and 15 are block diagrams illustrating memory modules according to example embodiments of the present disclosure. Each of memory modules 2000a and 2000b may be a dual in-line memory module (DIMM) that complies with the JEDEC (Joint Electron Device Engineering Council) standard. For example, the memory module 2000a may be a registered DIMM (RDIMM), and the memory module 2000b may be a load reduced DIMM (LRDIMM). A memory module according to an embodiment of the present disclosure may be implemented with a fully buffered DIMM (FB-DIMM), a small outline DIMM (SO-DIMM), or any other memory module (e.g., a single in-line memory module (SIMM)), as well as the above examples.

The memory module 2000a may include pins 2101 and 2201, a CA bus 2102, DQ buses 2202, memory devices MD1 to MD9, and a register clock driver RCD. The memory devices MD1 to MD9 may be substantially identical to the memory devices 1400 of FIG. 1, and the register clock driver RCD may be substantially identical to the register clock driver 1300 of FIG. 1.

The pins 2101 may include a clock pin and a CA pin receiving the clock signal CK and the CA signals CA from the memory controller 1100, respectively. The pins 2201 may include DQ pins and DQS pins that receive (write) DQ signals DQ and (write) DQS signals DQS from the memory controller 1100 or (read) DQ signals DQ and (read) DQS signals DQS from the memory devices MD1 to MD9. The DQ buses 2202 may include transmission paths that physically and electrically connect the pins 2201 of the memory module 2000a with pins of the memory devices MD1 to MD9. The register clock driver RCD may receive the clock signal CK and the CA signals CA through the pins 2101. The register clock driver RCD may send the received clock signal CK and the received CA signals CA to the memory devices MD1 to MD5 through a CA bus 2102*a* and to the memory devices MD6 to MD9 through a CA bus 2102*b*. The register clock driver RCD may buffer the clock signal CK and the CA signals CA. The CA bus 2102 may be shared by the memory devices MD1 to MD9, but the DQ buses 2202 may be respectively provided to the memory devices MD1 to MD9 and may not be shared by the memory devices MD1 to MD9.

The memory module 2000*b* may further include memory devices MD1a to MD5a, MD1c to MD5c, MD6b to MD9b, and MD6d to MD9d and data buffers DB1 to DB9 compared with the memory module 2000*a*. A CA bus 2102*a* may include transmission paths that physically and electrically connect the register clock driver RCD with pins of each of the memory devices MD1a to MD5a. A CA bus 2102*b* may include transmission paths that physically and electrically connect the register clock driver RCD with pins of each of the memory devices MD6b to MD9b. A CA bus 2102*c* may include transmission paths that physically and electrically connect the register clock driver RCD with pins of each of the memory devices MD1c to MD5c. A CA bus 2102*d* may include transmission paths that physically and electrically connect the register clock driver RCD with pins of each of the memory devices MD6d to MD9d. The register clock driver RCD may receive the clock signal CK and the CA signals CA through the pins 2101. The register clock driver RCD may send the received clock signal CK and the received CA signals CA to the memory devices MD1a to MD5a through the CA bus 2102*a*, may send the received clock signal CK and the received CA signals CA to the memory devices MD6b to MD9b through the CA bus 2102*b*, may send the received clock signal CK and the received CA signals CA to the memory devices MD1c to MD5c through the CA bus 2102*c*, and may send the received clock signal CK and the received CA signals CA to the memory devices MD6d to MD9d through the CA bus 2102*d*.

The data buffers DB1 may be disposed on the DQ buss 2202 between the memory devices MD1a and MD1c and the memory controller 1100. The data buffer DB1 may be physically and electrically connected with the pins of each of the memory devices MD1a and MD1c and may be physically and electrically connected with the pins 2201. The data buffer DB1 may buffer the DQ signals DQ and the DQS signals DQS associated with the memory devices MD1a and MD1c. The data buffer DB1 may send the buffered DQ signals DQ and the buffered DQS signals DQS to the memory devices MD1a and MD1c or the memory controller 1100. The remaining data buffers DB2 to DB9 may be implemented to be similar to the data buffer DB1. In an example embodiment, first surfaces (e.g., front surfaces) of the memory modules 2000*a* and 2000*b* are illustrated in FIGS. 14 and 15 as an example, but memory devices, data buffers, etc. may be mounted on second surfaces (e.g., back surfaces) of the memory modules 2000*a* and 2000*b*. For example, memory devices mounted on the first surface of each of the memory modules 2000*a* and 2000*b* may constitute a rank. Also, the number of memory devices included in each of the memory modules 2000*a* and 2000*b* is not limited to the examples illustrated in FIGS. 14 and 15.

Figure 16:
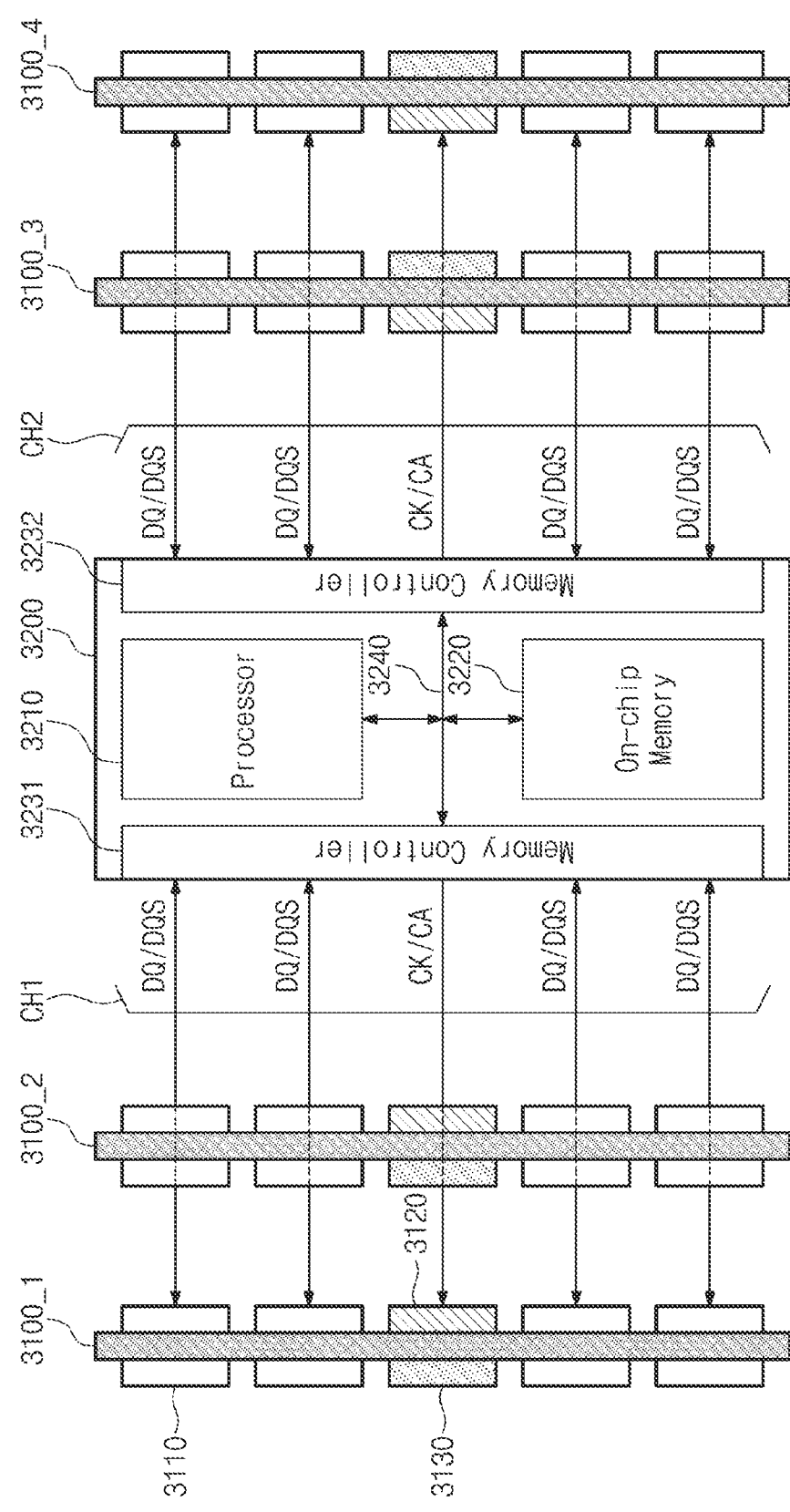
FIG. 16 is a block diagram illustrating a computing system according to an example embodiment of the present disclosure.

FIG. 16 is a block diagram illustrating a computing system according to an example embodiment of the present disclosure. A computing system 3000 may correspond to the electronic device 1000 described above and may include memory modules 3100_1 to 3100_4 and a host 3200. The memory modules 3100_1 to 31004 may correspond to the memory module 1200/2000*a*/2000*b*. The memory module 3100_1 may include a plurality of memory devices 3110, an RCD 3120, and a PMIC 3130. Each of the memory devices 3110 may be implemented to be substantially identical to the memory device 1400 of FIG. 1. The RCD 3120 may be substantially identical to the register clock driver 1300 of FIG. 1, may receive a CK signal and a CA signal transferred from the host 3200, and may send the received CK signal and the received CA signal to the plurality of memory devices 3110. The PMIC 3130 may supply power to internal components 3110 and 3120 in the memory module 3100_1. Each of the memory modules 3100_2 and 3100_4 may be substantially identical to the memory module 3100_1. The memory modules 3100_1 and 3100_2 may be allocated to a channel CH1. The memory modules 3100_3 and 31004 may be allocated to a channel CH2. The channel CH1 may include input/output paths for the memory modules 3100_1 and 31002, and the channel CH2 may include input/output paths for the memory modules 3100_3 and 3100_4. The number of channels CH1 and CH2, the number of memory devices 3110, the number of memory modules 3100_1 to 3100_4, and the number of memory modules per channel are provided only as an example. The host 3200 may be an application processor (AP) or a system-on-chip (SoC). The host 3200 may include a system bus 3240 connecting a processor 3210, an on-chip memory 3220, memory controllers 3231 and 3232, and the above components. The processor 3210 may execute various software (e.g., an application program, an operating system, a file system, and a device driver) loaded to the on-chip memory 3220. The processor 3210 may include a homogeneous multi-core or a heterogeneous multi-core. For example, the processor 3210 may include at least one of a central processing unit (CPU), an image signal processing unit (ISP), a digital signal processing unit (DSP), a graphics processing unit (GPU), a vision processing unit (VPU), and a neural processing unit (NPU). An application program, an operating system, a file system, a device driver, etc. for driving the computing system 3000 may be loaded to the on-chip memory 3220. The on-chip memory 3220 may be an SRAM or a register that is implemented within the host 3200 and has a faster data input/output speed than the memory modules 3100_1 to 3100_4. The on-chip memory 3220 may be referred to as a "buffer memory". The memory controllers 3231 and 3232 may correspond to the memory controller 1100 described above. The memory controller 3231 may access the memory modules 3100_1 and 3100_2 through the channel CH1 under control of the processor 3210. The memory controller 3232 may access the memory modules 3100_3 and 3100_4 through the channel CH2 under control of the processor 3210.

As described above, a register clock driver may train a clock for sampling output signals of an operating circuit through a phase locked loop and a phase interpolator. As such, the register clock driver may sample unaligned output signals of the operating circuit without a bit error. The register clock driver according to the present disclosure may reduce the number of repeaters to adjust the skew of each of the CA signals CA and may reduce current consumption.

According to an embodiment of the present disclosure, a register clock driver may perform a multi-training operation. As such, a register clock driver with improved operation stability and reliability, an operating method of the register clock driver, and a memory module including the register clock driver and a plurality of memory devices are provided.

While the present disclosure has been described with reference to example embodiments thereof, it will be apparent to those of skill in the art that various changes and modifications may be made thereto without departing from the spirit and scope of the present disclosure as set forth in the following appended claims.

What is claimed is:

1. A register clock driver comprising:

an operating circuit configured to buffer a command and an address received from an external memory controller; and a training circuit configured to perform a first training operation and a second training operation in an initialization operation, wherein, in the first training operation, one of a plurality of reference clock signals is selected as a first training clock signal for sampling output signals output from the operating circuit, wherein, in the second training operation, a second training clock signal for sampling the output signals is selected through phase adjustment based on the first training clock signal, and wherein the training circuit further includes;

a control logic circuit including a pattern generating circuit configured to generate a pattern to be used in the first training operation and the second training operation;

a phase interpolator configured to generate an interpolation clock signal through phase interpolation based on a sampling clock signal; and an output circuit configured to sample, based on the interpolation clock signal, the output signals output from the operating circuit and to output command address signals to external memory devices.

2. The register clock driver of claim 1, wherein the training circuit includes:

a phase locked loop configured to generate the plurality of reference clock signals having different phases, and wherein, in a normal operation, the training circuit samples the output signals based on the second training clock signal and outputs the command address signals to the external memory devices.

3. The register clock driver of claim 2, wherein the control logic circuit includes a delay control circuit configured to generate a first control signal, a second control signal, and a third control signal; and wherein the training circuit further includes:

a selecting circuit configured to select either the pattern or command address signals received from the external memory controller in response to the first control signal so as to be output to the operating circuit;

a first training circuit configured to receive the plurality of reference clock signals and to output one of the plurality of reference clock signals as the sampling clock signal in response to the second control signal; and wherein, in response to the third control signal, the phase interpolator generates the interpolation clock signal through the phase interpolation based on the sampling clock signal output from the first training circuit.

4. The register clock driver of claim 3, wherein the output circuit includes a first flip-flop and a second flip-flop, wherein, in response to the interpolation clock signal, the first flip-flop outputs a logical level of a first output signal among the output signals as a first output command address signal among the command address signals to the external memory devices, and wherein, in response to the interpolation clock signal, the second flip-flop outputs a logical level of a second output signal among the output signals as a second output command address signal among the command address signals to the external memory devices.

5. The register clock driver of claim 3, wherein the delay control circuit outputs the second control signal indicating a first reference clock signal among the plurality of reference clock signals in a first detection step of the first training operation and outputs the second control signal indicating a second reference clock signal among the plurality of reference clock signals in a second detection step of the first training operation.

6. The register clock driver of claim 3, wherein the delay control circuit outputs the third control signal indicating a first phase difference in a first interpolation step of the second training operation and outputs the third control signal indicating a second phase difference different from the first phase difference in a second interpolation step of the second training operation, wherein, in the first interpolation step, the phase interpolator generates the interpolation clock signal having the first phase difference with the first training clock signal in response to the third control signal, and wherein, in the second interpolation step, the phase interpolator generates the interpolation clock signal having the second phase difference with the first training clock signal in response to the third control signal.

7. The register clock driver of claim 3, wherein the control logic circuit further includes:

an AND gate configured to receive feedback command address signals obtained by sampling the output signals from the output circuit based on the interpolation clock signal and to output a sum signal by performing a logical operation on the feedback command address signals, and wherein the control logic circuit selects the first and second training clock signals based on the sum signal.

8. The register clock driver of claim 7, wherein the control logic circuit further includes:

a register configured to store the sum signal; and a parameter control circuit configured to control an interpolation section and an interpolation count of the second training operation.

9. The register clock driver of claim 1, wherein the first and second training operations are simultaneously performed with the initialization operation which is performed together with the external memory controller.

10. An operating method of a register clock driver which includes an operating circuit and a training circuit, the training circuit including a pattern generating circuit, the method comprising:

generating, by the pattern generating circuit of the training circuit, a pattern in an initialization operation to be used in a first training operation and a second training operation;

performing, by the training circuit, the first training operation, in which one of a plurality of reference clock signals is selected as a first training clock signal for sampling output signals output from the operating circuit, in the initialization operation;

performing, by the training circuit, the second training operation, in which a second training clock signal for sampling the output signals is selected through phase interpolation using the first training clock signal, in the initialization operation, wherein a phase interpolator of the training circuit generates an interpolation clock signal through the phase interpolation using a sampling clock signal; and

sampling, by the training circuit using the interpolation clock signal, the output signals output from the operating circuit in a normal operation such that command address signals are output to external memory devices.

11. The method of claim 10, wherein the performing of the first training operation includes:

performing a first detection step in which a first sum signal is generated by sampling the output signals based on a first reference clock signal among the plurality of reference clock signals to generate first feedback command address signals and performing a logical operation based on the first feedback command address signals;

performing a second detection step in which a second sum signal is generated by sampling the output signals based on a second reference clock signal among the plurality of reference clock signals to generate second feedback command address signals and performing the logical operation based on the second feedback command address signals; and selecting one of the first and second reference clock signals as the first training clock signal based on the first and second sum signals.

12. The method of claim 10, wherein the performing of the second training operation includes:

performing a first interpolation step in which a first sum signal is generated by generating a first interpolation clock signal based on the first training clock signal sampling the output signals based on the first interpolation clock signal to generate first feedback command address signals, and performing a logical operation based on the first feedback command address signals;

performing a second interpolation step in which a second sum signal is generated by generating a second interpolation clock signal different from the first interpolation clock signal based on the first training clock signal, sampling the output signals based on the second interpolation clock signal to generate second feedback command address signals, and performing the logical operation based on the second feedback command address signals; and selecting one of the first and second interpolation clock signals as the second training clock signal based on the first and second sum signals.

13. The method of claim 12, wherein the first and second interpolation clock signals are generated by performing the phase interpolation based on the first training clock signal by a phase interpolator of the training circuit.

14. The method of claim 10, further comprising:

determining a parameter of the second training operation after performing the first training operation, wherein the performing of the second training operation includes:

performing the second training operation based on the parameter of the second training operation.

15. The method of claim 14, wherein the determining of the parameter of the second training operation includes:

determining an interpolation section; and determining an interpolation count.

16. The method of claim 10, further comprising:

storing a result of the first training operation and a result of the second training operation, wherein the result of the second training operation includes information about the first training clock signal and information about the second training clock signal.

17. The method of claim 10, wherein the plurality of reference clock signals have different phases and are generated by a phase locked loop of the training circuit.

18. A memory module comprising:

a plurality of memory devices each including a memory cell array; and a register clock driver connected with the plurality of memory devices, wherein the register clock driver includes:

an operating circuit configured to buffer a command and an address received from an external memory controller; and a training circuit configured to perform a first training operation and a second training operation in an initialization operation, wherein, in the first training operation, one of a plurality of reference clock signals is selected as a first training clock signal for sampling output signals output from the operating circuit, wherein, in the second training operation, a second training clock signal for sampling the output signals is selected through phase adjustment based on the first training clock signal, wherein, in a normal operation, the training circuit is configured to sample the output signals based on the second training clock signal and to output command address signals to the plurality of memory devices, and wherein the training circuit further includes;

a control logic circuit including a pattern generating circuit configured to generate a pattern to be used in the first training operation and the second training operation;

a phase interpolator configured to generate an interpolation clock signal through phase interpolation based on a sampling clock signal; and an output circuit configured to sample, based on the interpolation clock signal, the output signals output from the operating circuit and to output the command address signals to the plurality of memory devices.

19. The memory module of claim 18, wherein the control logic circuit includes a delay control circuit configured to generate a first control signal, a second control signal, and a third control signal; and wherein the training circuit further includes:

a selecting circuit configured to select either the pattern or command address signals received from the external memory controller in response to the first control signal so as to be output to the operating circuit;

a first training circuit configured to receive the plurality of reference clock signals and to output one of the plurality of reference clock signals as the sampling clock signal in response to the second control signal;

a second training circuit including the phase interpolator; and a phase locked loop configured to generate the plurality of reference clock signals having different phases.

20. The memory module of claim 19, wherein the control logic circuit further includes:

an AND gate configured to receive feedback command address signals obtained by sampling the output signals from the output circuit based on the interpolation clock signal and to output a sum signal by performing a logical operation on the feedback command address signals, and wherein the control logic circuit selects the first and second training clock signals based on the sum signal.

\* \* \* \* \*